US010532795B2

(12) United States Patent
Laird et al.

(10) Patent No.: US 10,532,795 B2
(45) Date of Patent: Jan. 14, 2020

(54) FLEXIBLE REGASIFICATION AND FLOATING THERMAL ENERGY STORAGE

(71) Applicants: TRINITY MARINE PRODUCTS, INC., Dallas, TX (US); REV CLEAN POWER LLC, Houston, TX (US)

(72) Inventors: Thomas S. Laird, Houston, TX (US); Efrain Aguiluz, Houston, TX (US); Neal Langdon, Goodlettsville, TN (US); Jesse Mark Brumbaugh, Houson, TX (US)

(73) Assignees: Arcosa Marine Products, Inc., Dallas, TX (US); Rev Clean Power LLC, Houston, TX (US)

( * ) Notice: Subject to any disclaimer, the term of this patent is extended or adjusted under 35 U.S.C. 154(b) by 0 days.

(21) Appl. No.: 15/772,906

(22) PCT Filed: Aug. 17, 2017

(86) PCT No.: PCT/US2017/047407
§ 371 (c)(1),
(2) Date: May 2, 2018

(87) PCT Pub. No.: WO2018/035355
PCT Pub. Date: Feb. 22, 2018

(65) Prior Publication Data
US 2019/0176937 A1 Jun. 13, 2019

Related U.S. Application Data

(60) Provisional application No. 62/376,280, filed on Aug. 17, 2016, provisional application No. 62/409,945, filed on Oct. 19, 2016.

(51) Int. Cl.
B63B 25/16 (2006.01)
F17C 7/04 (2006.01)
(Continued)

(52) U.S. Cl.
CPC .............. *B63B 25/16* (2013.01); *B63B 27/24* (2013.01); *B63H 21/383* (2013.01); *F17C 7/04* (2013.01);
(Continued)

(58) Field of Classification Search
CPC ....... B63B 25/16; B63B 27/24; B63H 21/383; F17C 7/04
See application file for complete search history.

(56) References Cited

U.S. PATENT DOCUMENTS 3,978,663 A * 9/1976 Mandrin ................. F02C 7/143
60/728
4,276,927 A * 7/1981 Foust .................... F28D 9/0081
165/70
(Continued)

OTHER PUBLICATIONS

PCT International Search Report with Written Opinion (ISA/210/220/237) dated Oct. 30, 2017.

*Primary Examiner* — Stephen P Avila
(74) *Attorney, Agent, or Firm* — Baker Botts, LLP

(57) ABSTRACT

According to some embodiments, a flexible regasification system comprises a floating liquefied natural gas (LNG) storage vessel; a LNG vaporizer disposed on a jetty proximate the LNG storage vessel to vaporize the LNG into natural gas; and a thermal fluid source. The LNG storage vessel is coupled to the LNG vaporizer and supplies LNG to the LNG vaporizer. The thermal fluid source is coupled to the LNG vaporizer and sends heated thermal fluid to the LNG vaporizer for converting the LNG to natural gas, which converts the heated thermal fluid to a cooled thermal fluid. The cooled thermal fluid is discharged back to the thermal fluid source, comprising a closed loop. In particular embodiments, the thermal fluid storage comprises a floating vessel (Continued)

disposed near the jetty. In some embodiments, the cooled thermal fluid from the LNG vaporizer is first sent to a power plant or refrigeration plant.

43 Claims, 11 Drawing Sheets

(51) Int. Cl.
 *B63B 27/24* (2006.01)
 *B63H 21/38* (2006.01)
(52) U.S. Cl.
 CPC ............... *F17C 2221/033* (2013.01); *F17C 2270/0105* (2013.01); *Y02T 70/34* (2013.01)

(56) References Cited

U.S. PATENT DOCUMENTS

| | | | |
|---|---|---|---|
| 5,588,297 A * | 12/1996 | Uehara | ............... F01K 25/065 60/649 |
| 6,367,258 B1 | 4/2002 | Wen | |
| 9,810,478 B2 * | 11/2017 | Isaacson | ............... F25J 1/0022 |
| 10,012,151 B2 * | 7/2018 | Thatcher | ............... F02C 9/00 |
| 10,047,633 B2 * | 8/2018 | Manchikanti | ......... F01D 25/162 |
| 2006/0010911 A1 | 1/2006 | Hubbard | |
| 2007/0144184 A1 | 6/2007 | Wijingaarden | |
| 2008/0295526 A1 | 12/2008 | Boatman | |
| 2009/0100845 A1 | 4/2009 | Amir | |

* cited by examiner

FLEXIBLE REGASIFICATION AND FLOATING THERMAL ENERGY STORAGE

PRIORITY

This nonprovisional application is a U.S. National Stage Filing under 35 U.S.C. § 371 of International Patent Application Serial No. PCT/US2017/047407 filed Aug. 17, 2017 and entitled "*Flexible Regasification and Floating Thermal Energy Storage*" which claims priority to U.S. Provisional Patent Application No. 62/376,280 filed Aug. 17, 2016 and U.S. Provisional Patent Application No. 62/409,945 filed Oct. 19, 2016, all of which are hereby incorporated by reference in their entirety.

TECHNICAL FIELD

This disclosure relates generally to a regasification system, such as a liquefied natural gas (LNG) regasification system, and more particularly to a flexible regasification system with a thermal fluid source vessel (e.g., water, glycol, brine, etc.) with ancillary benefits such as energy optimization and flare control.

BACKGROUND

Regasification vaporizes a liquefied gas, such as liquefied natural gas (LNG), back into a gas at ambient temperatures greater than 40° F. Examples of regasification systems include a LNG regasification terminal and a Floating Storage Regasification Unit (FSRU). Efficient transportation and storage of natural gas includes liquefying the natural gas so that the gas may be transported and stored in a condensed form (approximately $\frac{1}{600}^{th}$ the volume). When the LNG reaches its destination, the stored LNG may be regasified for distribution to downstream end-users (e.g., gas pipeline or gas fired power plants). The LNG regas terminal located at the destination receives and stores the LNG and carries out the regasification process for natural gas send out.

SUMMARY

According to some embodiments, a flexible regasification system comprises a floating liquefied natural gas (LNG) storage vessel. The LNG storage vessel comprises a LNG outlet operable to supply LNG from the LNG stored onboard the floating LNG storage vessel. The system further comprises a LNG vaporizer disposed on a jetty proximate the LNG storage vessel. The LNG vaporizer comprises a LNG inlet coupled to the LNG outlet of the floating LNG storage vessel. The LNG inlet is operable to receive LNG from the floating LNG storage vessel. The LNG vaporizer further comprises a natural gas outlet operable to send natural gas downstream; a thermal fluid inlet operable to receive a heated thermal fluid; and a thermal fluid outlet operable to discharge a cooled thermal fluid. The LNG vaporizer is operable to use the heated thermal fluid to vaporize the LNG into natural gas which converts the heated thermal fluid to a cooled thermal fluid. The system further comprises a thermal fluid source. The thermal fluid source comprises: a storage tank operable to store a thermal fluid, and a heated thermal fluid outlet coupled to the thermal fluid inlet of the LNG vaporizer. The heated thermal fluid outlet is operable to supply heated thermal fluid to the LNG vaporizer. The thermal fluid source further comprises a cooled thermal fluid inlet coupled to the thermal fluid outlet of the LNG vaporizer. The cooled thermal fluid inlet is operable to receive cooled thermal fluid discharged from the LNG vaporizer. The thermal fluid coupling between the thermal fluid source and the LNG vaporizer comprises a closed loop.

In particular embodiments, the system further comprises a gas heater. The gas heater is coupled to the natural gas outlet of the LNG vaporizer and operable to convert received natural gas to heat. The gas heater is also coupled to the thermal fluid source and operable to heat the thermal fluid in the storage tank of the thermal fluid source to convert the cooled thermal fluid to the heated thermal fluid. The floating LNG storage vessel may further comprise a boil-off gas outlet, and the boil off gas outlet may be coupled to the gas heater. The system may further comprise a flare. The flare is operable to dispose of natural gas not consumed by the gas heater. In particular embodiments, the thermal fluid source comprises a floating vessel. The gas heater may be disposed on the floating vessel. The storage tank of the thermal fluid source may comprise a storage tank integrated into a hull of the floating vessel. A space between the storage tank and the hull of the floating vessel may comprise thermal insulation. In some embodiments, the thermal fluid source comprises a storage tank disposed on the jetty.

In particular embodiments, the system further comprises a heat exchanger coupled to the natural gas outlet of the LNG vaporizer. The heat exchanger is operable to heat the downstream natural gas to a predetermined temperature. The heat exchanger may be coupled to the heated thermal fluid outlet of the thermal fluid source.

In particular embodiments, the thermal fluid outlet of the LNG vaporizer is coupled to a cold thermal fluid reuse facility, and the thermal fluid reuse facility is coupled to the cooled thermal fluid inlet of the thermal fluid source. Some embodiments may include a heat exchanger coupled to the cooled thermal fluid inlet of the thermal fluid source and an exhaust gas from the cold thermal reuse facility. The heat exchanger is operable to cause condensation from the moisture in the exhaust gas. A condensate collection system may be coupled to the heat exchanger. The condensate collection system is operable to collect water condensate from the heat exchanger. The thermal fluid reuse facility may comprise at least one of a power plant, a data center, a refrigeration plant, and a district cooling source. The cold thermal fluid reuse facility may be disposed on the floating thermal fluid source vessel.

In particular embodiments, the heated thermal fluid outlet of the thermal fluid source is coupled to a hot thermal fluid reuse facility. The hot thermal fluid reuse facility is coupled to the cooled thermal fluid inlet of the thermal fluid source. The hot thermal fluid reuse facility may comprise at least one of a LNG vaporizer, a steam production plant, a hot water production plant, a desalination plant, and a district heating source. The hot thermal fluid reuse facility may be disposed on the floating thermal fluid source vessel.

According to some embodiments, a floating thermal fluid source vessel comprises a thermal fluid storage tank operable to store a thermal fluid; a thermal fluid outlet operable to supply heated thermal fluid; and a thermal fluid inlet operable to receive cooled thermal fluid. The thermal fluid storage tank may be integrated into a hull of the floating thermal fluid source vessel. A space between the thermal fluid storage tank and the hull may comprise thermal insulation.

In particular embodiments, the vessel further comprises a heater. The heater is operable to fire gas or fuel oil to generate heat. The heater is coupled to the thermal fluid storage tank and operable to heat a thermal fluid in the thermal fluid storage tank.

In particular embodiments, the thermal fluid outlet is coupled to a hot thermal fluid reuse facility. The hot thermal fluid reuse facility is coupled to the coupled to the cooled thermal fluid inlet. The hot thermal fluid reuse facility may be disposed on the floating thermal fluid source vessel. The hot thermal fluid reuse facility may comprise at least one of a LNG vaporizer, a steam production plant, a hot water production plant, a desalination plant, and a district heating source.

According to some embodiments, a method of regasifying LNG comprises positioning a floating LNG storage vessel proximate to a jetty; positioning a LNG vaporizer on the jetty; positioning a thermal fluid source proximate the LNG vaporizer; transmitting LNG from the floating LNG storage vessel to the LNG vaporizer; transmitting thermal fluid from the thermal fluid source to the LNG vaporizer; and vaporizing the LNG using the thermal fluid.

In particular embodiments, the floating LNG storage vessel comprises a LNG outlet. The LNG vaporizer comprises: a LNG inlet; a natural gas outlet; a thermal fluid inlet; and a thermal fluid outlet. The thermal fluid source comprises: a heated thermal fluid outlet; and a cooled thermal fluid inlet. The method further comprises: coupling the LNG outlet of the floating LNG storage vessel to the LNG inlet of the LNG vaporizer; coupling the heated thermal fluid outlet of the thermal fluid source to the thermal fluid inlet of the LNG vaporizer; and coupling the cooled thermal fluid inlet of the thermal fluid source to the thermal fluid outlet of the LNG vaporizer. The coupling between the thermal fluid source and the LNG vaporizer comprises a closed loop.

In particular embodiments, the method further comprises coupling a gas heater to the thermal storage source. The method may also comprise coupling a boil-off gas outlet of the floating LNG storage vessel to the gas heater.

In particular embodiments, the thermal fluid source comprises a floating vessel. The method may further comprise positioning the gas heater on the floating vessel. The floating vessel may comprise a storage tank integrated into its hull. A space between the storage tank and the hull may comprise thermal insulation. In some embodiments, the thermal fluid source comprises a storage tank disposed on the jetty.

In particular embodiments, the method further comprises coupling a heat exchanger to the natural gas outlet of the LNG vaporizer. The heat exchanger is operable to heat the downstream natural gas to a predetermined temperature. The method may further comprise coupling the heat exchanger to the heated thermal fluid outlet of the thermal fluid source.

In particular embodiments, the method further comprises coupling the thermal fluid outlet of the LNG vaporizer to a cold thermal fluid reuse facility, and coupling the cold thermal fluid reuse facility to the cooled thermal fluid inlet of the thermal fluid source. Some embodiments may include coupling a heat exchanger to the cooled thermal fluid inlet of the thermal fluid source and to an exhaust gas from the cold thermal reuse facility, and coupling a condensate collection system to the heat exchanger. The heat exchanger is operable to cause condensation from the moisture from exhaust gas. The condensate collection system is operable to collect water condensate from the heat exchanger. The cold thermal fluid reuse facility may comprise at least one of a power plant, a data center, a refrigeration plant, and a district cooling source. In some embodiments, the cold thermal fluid reuse facility may be disposed on the floating thermal fluid source vessel.

In particular embodiments, the method comprises coupling the thermal fluid outlet of the thermal fluid source to a hot thermal fluid reuse facility, and coupling the hot thermal fluid reuse facility to the cooled thermal fluid inlet of the thermal fluid source. The hot thermal fluid reuse facility may comprise at least one of a LNG vaporizer, a steam production plant, a hot water production plant, a desalination plant, and a district heating source. In some embodiments, the method further comprises disposing the hot thermal fluid reuse facility onto the floating thermal fluid source vessel.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
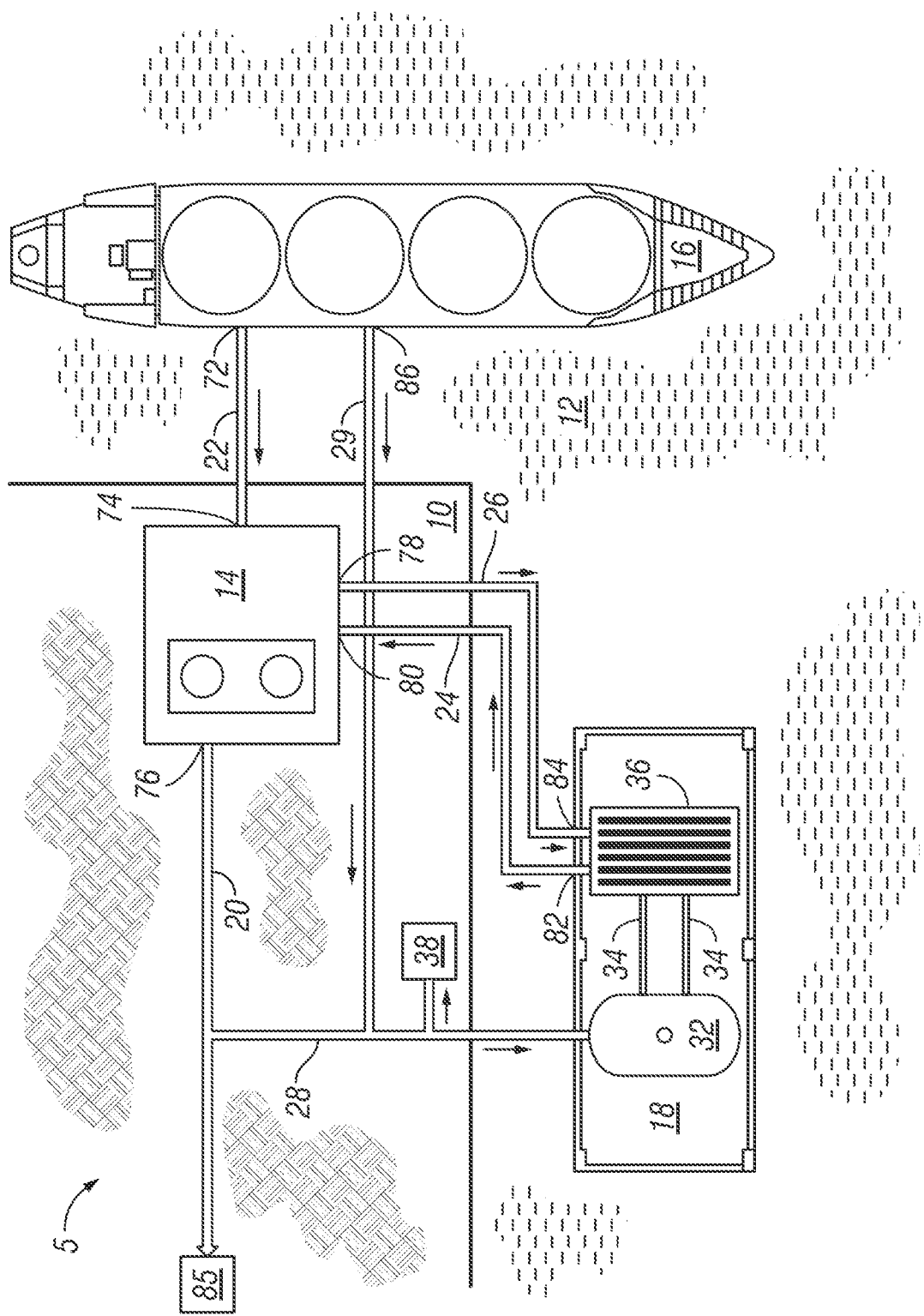
FIG. 1 is a block diagram illustrating an example flexible regasification system with a floating thermal fluid source vessel, according to some embodiments.

A flexible regasification system, such as REV Accelerated Gas Systems, receives LNG for storage and vaporizes the LNG into natural gas at ambient temperatures by integrating innovative technologies on an eco-friendly platform that is safe, flexible, scalable and repeatable, with significantly lower capital and operating expense. The ambient temperature natural gas leaves the flexible regasification system for distribution to end-users through a conventional gas pipeline distribution system.

The REV Accelerated Gas Systems flexible regasification system may significantly reduce capital and operating expense as compared to a specially designed FSRU, which essentially is a special fit for purpose, modified LNG carrier intended to regas onboard the vessel. For example, the flexible regasification system may employ conventional LNG vessel(s) as permanently (or semi-permanently) floating LNG storage, at substantially lower charter rates while berthed adjacent to a concrete jetty or pad with sufficient area for mounting the flexible vaporizer systems and their requisite safety and gas handling systems (e.g., purging, firefighting, boil-off-gas, compressors, primary & emergency flare control, etc.).

The safe, flexible compact regasification system facilitates the usage of scalable vaporizer systems either separate or combined deployed on the concrete jetty pad, rather than fitted-out onboard the LNG carrier vessel itself, such as with an FSRU.

Vaporizer systems vary in technology, size, and function. Vaporizer systems which cannot be practicably integrated onboard a conventional LNG carrier vessel (e.g., unwieldy on deck because of size and/or stability concerns, obscuring lines of sight from the navigation bridge, and/or operationally constrained by the vessel motion), may be, however, safely deployed to the concrete jetty pad, collocated proximate to conventional LNG vessels permanently (or semi-permanently) berthed as floating LNG storage without encumbrances, similar to well-proven land-based regasification deployed technologies.

The flexible regasification system promotes a minimal, modular footprint intended for inshore locations at a low capital and operating expense for natural gas delivery. The system is scalable and repeatable with sufficient redundancy with due regard for safety and reliability.

Advantages of the system include increased efficiency, boil-off-gas management and primary flare control without conventional flaring (except in emergencies) for an environmentally-friendly, closed-loop (thermal fluid) system, without waste water. Hot water discharge issues are resolved and primary flare control (e.g., with Volcanic heaters acting as Gas Combustion Unit(s) (GCU)) operate in an environmentally friendly way with a low carbon footprint. The cooled thermal fluid may be optimized for the thermal reuse facility instead of discharging water into the water body in an open loop system.

Whenever floating LNG storage is loaded and/or boil-off gas is generated, typically a flare manages the excess gas. An ancillary benefit of thermal fluid storage is that the excess gas can be routed to gas-fired heaters (e.g., Volcanic) serving as primary flare control which may be used to heat up the fluid in the thermal fluid storage tank. If excessive heat is generated, then an absorption chiller can act as a trim cooler. The flare serves as an emergency backup.

In some embodiments (see e.g., FIG. 2), a flexible regasification system, such as the REV Accelerated Gas System, may include vaporizers such as a Linde "Submerged Combustion Vaporizer" (SCV)" (combustor off with the option to turn the combustor on) coupled with a Wood Group (formally Mustang Engineering) LNG Smart® Air Vaporizer (SAV) and/or comparable ambient air vaporizer (AAV) system serving as a secondary and/or primary regasification technology (less than 250 million standard cubic feet per day (MMSCFD), equatorial zone, no power generation). In particular embodiments, the jetty may comprise a stable 200 foot by 90 foot concrete jetty or pad, which is sufficient up to 250 MMSCFD SAV mounted technology.

In some embodiments (see e.g., FIGS. 3 and 11), a flexible regasification system, such as the REV Accelerated Gas Systems, may include vaporizers such as a Linde "Submerged Combustion Vaporizer" (SCV)" (combustor off with the option to turn the combustor on) as the primary means of regasification (between 50 MMSCFD and 450 MMSCFD, subequatorial zone, no power generation).

A particular advantage of the flexible regasification system includes the efficient integration of a floating storage unit (e.g., conventional LNG vessel) and a stable jetty pad, with the vaporizer units as harmonized regasification systems for a hybrid platform. The vaporizer unit is collocated with a floating thermal fluid source vessel that recirculates the fluid to the vaporizer unit (combustor off) via a closed-loop thermal fluid supply and return lines. Advantages of the hybridized system may include, but are not limited to, reduction of emissions, fuel usage, vaporization redundancy, equatorial zone efficiency, and compatibility with jetty pad footprint constraints.

Figure 4:
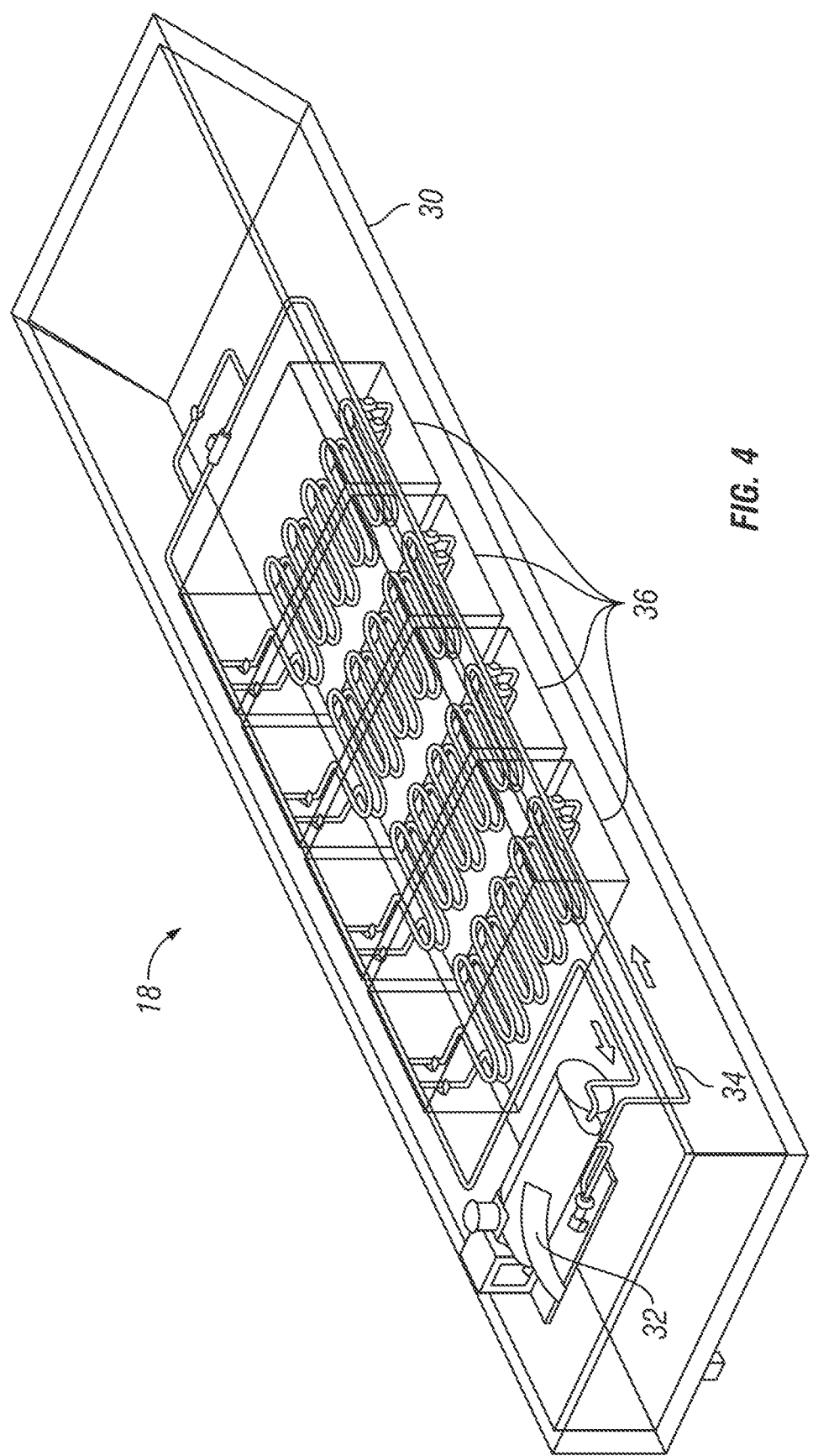
FIG. 4 is a block diagram illustrating an example floating thermal fluid source vessel, according to a particular embodiment.

The vaporizer unit may be paired with a barge or other floating vessel, such as a Trinity Marine Products, Inc. floating "Hot Oil (thermal fluid) Barge (Vessel)" with 30,000 barrel (42 gallons per barrel) capacity storage for vaporizer thermal energy via gas fired heater(s) such as a Volcanic heater (see e.g., FIG. 4).

A floating thermal fluid source vessel(s) may also include an option for spray foam insulation (or other environmentally suitable insulation) as applied on the exterior cargo (thermal fluid) tanks (hull void space) for thermal energy containment. The closed-loop thermal fluid is recirculated to the vaporizer unit via closed-loop thermal fluid supply and return lines.

The floating thermal fluid source vessel(s) operate in a closed-loop direct to the SCV unit (combustor off) mounted on a stable jetty pad. Degradation of the SCV unit (combustor on) associated with acidic exhaust gases ($CO_2$) in the hot fluid bath is avoided by minimizing combustion and production of acid gases. Waste water management—which is required for an acidic, deoxygenated SCV (combustor on) hot water bath—may be eliminated for an eco-friendly solution.

The floating thermal fluid source vessel(s) provide sufficient heat for the vaporizer unit. Essentially, ample heat rate is provided by co-located heater(s) heating the thermal fluid which is circulated by pump(s) to provide a suitable vaporizer unit inflow temperature (e.g., of approximately 108° F.). The number of heater(s) (e.g., Volcanic heaters with 88% efficiency) may be determined based on the heat rate requirement (Mmbtu/hr) and heater unit efficiency with thermostatic control, which will be sized appropriately to provide adequate heat as required for one vaporizer unit as paired with one floating thermal fluid source vessel to deliver up to 50 MMSCFD, scalable to 450 MMSCFD with a turndown capability of 10.5 MMSCFD (7% of 150 MMSCFD) natural gas send out.

Occasionally, makeup thermal fluid may be added to maintain sufficient fluid levels for the vaporizer unit (combustor off). Some embodiments may include a skid mounted reverse osmosis unit positioned on the concrete jetty pad with associated tankage. In certain embodiments, the fresh water produced by the AAV may be repurposed accordingly.

The floating thermal fluid source vessel(s) are connected by a closed thermal fluid loop recirculating piping system (out/in) directly to the vaporizer unit (combustor off). In some embodiments, notwithstanding the primary closed-loop (thermal fluid) primary flare control system (e.g., with Volcanic heaters acting as Gas Combustion Unit(s) (GCU)), an independent high pressure flare control system for gas vapor emergency management may be integrated into the overall design. The emergency high pressure flare is located on the boil-off-gas supply line as a safety feature and is located near the berthed floating thermal fluid source vessel(s).

In the event that the various gas fired systems onboard the thermal fluid vessel(s) and associated jetty pad system (e.g., with Volcanic heater(s) acting as a GCU, cargo pumps, generator, and floating storage unit power generation) cannot adequately utilize the boil-off gas, the boil-off gas may be diverted to the high pressure emergency flare system.

A particular advantage of the flexible regasification system includes the efficient integration of a floating storage unit (e.g., conventional LNG vessel), jetty pad, and vaporizer units as harmonized regasification systems. The vaporizer unit (combustor off) is collocated with a floating thermal fluid source vessel(s) that recirculates thermal fluid to the vaporizer unit (combustor off) via closed-loop thermal fluid supply and return lines.

The thermal fluid vessel(s) comprise onboard gas fired heater(s), cargo (thermal fluid) pumps, and generator systems. Boil-off-gas management and primary flare control are managed by compressors and/or used for operating the gas fired thermal fluid vessel(s) systems (inclusive of GCU mode) and/or floating storage unit systems and/or diverted in an emergency to the high pressure flare system.

The regasification system includes a blended solution with both floating thermal fluid source vessel(s) and jetty pad mounted flexible assets, securely positioned in close proximity to the floating storage unit. The modular assets are typically built in a controlled environment and/or obtained off-the-shelf and delivered as a complete package to the site, commissioning and startup similar to the FSRU model for a flexible solution.

The flexible regasification system facilitates low capital and operating expenses, while also providing scalability, repeatability, increased efficiency with a closed-loop (thermal fluid) system, no waste water or hot water discharge issues, and due regard for boil-off management and primary flare control (e.g., acting as a GCU) in an environmentally friendly way for a low carbon footprint.

The flexible regasification system delivers natural gas to downstream end-users (e.g., boilers and/or power generation) with an easy to deploy, fast track, all-inclusive, turnkey package. Globally, a number of mid and large scale LNG terminals are coming online with additional LNG tonnage, exacerbating the current LNG supply (glut) and demand imbalance, causing an increase surplus. An objective of the REV Accelerated Gas Systems platform is to remove obstacles and stimulate downstream constrained and/or stranded niche markets between 50 MMSCFD and 450 MMSCFD.

Additionally, there is an oversupply of conventional LNG carrier tonnage currently available at lower charter rates, which creates an opportunity for the underemployed LNG carriers to compete in the FSRU niche market space for a substantial added value beyond transportation, deployed as permanently (or semi-permanently) berthed floating storage units alongside the REV Accelerated Gas Systems flexible regasification system.

In some embodiments, the LNG floating storage vessel(s) (twin berthed) will afford additional storage capacity and may include a requisite number of appropriately sized fenders (e.g., Yokohama) between the vessel(s). The floating storage vessel(s) may receive LNG as delivered by a conventional LNG carrier. The floating storage vessel(s) may also include a number of appropriately sized fenders (e.g., Yokohama) between themselves and the conventional LNG delivery vessel. All floating storage vessel(s) include sufficient LNG volume according to the maximum allowable floating storage capacity.

LNG cargo lightering from the LNG delivery vessel to the LNG floating storage vessels(s) may be performed by cryogenic and vapor hoses via ship-to-ship transfer according to commercially accepted industry practices (e.g., according to Society of International Gas Tanker and Terminal Operators (SIGTTO) guidelines). In some embodiments, the LNG floating storage vessel(s) (twin berthed) transfer LNG to the stable jetty pad and concrete mounted vaporization units with the return vapor line back to the LNG floating storage vessel(s) (twin berthed) for vapor balancing.

A system that may compliment the jetty-less floating storage vessel(s) mooring arrangement is the floating Autonomous Transfer System (ATS) designed by 7Seas™ employing the Trelleborg floating cryogenic hoses acting as an intermediary between the LNG floating storage vessels (s) (twin berthed) and the stable jetty pad mounted vaporization units.

FIG. 1 is a block diagram illustrating example flexible regasification system with a floating thermal fluid source vessel, according to some embodiments. Flexible regasification system 5 includes jetty 10 adjacent to water body 12. Jetty 10 includes LNG vaporizer system 14. LNG vaporizer system 14 supplies natural gas to end-users 85 through distribution pipeline 20. Flexible regasification system 5 also includes floating LNG storage vessel(s) 16 and floating thermal fluid source vessel(s) 18 both moored near jetty 10.

In particular embodiments, jetty 10 may comprise a stable 200 foot by 90 foot concrete jetty or pad which is theoretically sufficient to produce up to 250 MMSCFD of natural gas from mounted vaporizer technology. In other embodiments, jetty 10 may comprise any suitable size for accommodating the regasification components.

The term jetty is used throughout this disclosure in a general sense to refer any stable platform either on land, or connected to the land (such as a jetty, pier, quay, wharf, dock, etc.), or connected to the seafloor (such as a bottom founded barge or jack-up structure). In some embodiments, the term jetty may refer to a stable pad (e.g., concrete, rock, asphalt, wood, etc.) near a shoreline of water body 12. Water body 12 may refer to an ocean, bay, lake, river, or any other water body suitable for commercial activity.

LNG vaporizer system 14 includes one or more vaporizers for regasifying LNG. LNG vaporizer 14 may also be referred to as a gas vaporizer. In some embodiments, LNG vaporizer system 14 may include a SCV (combustor off with the option to turn the combustor on) coupled with another vaporizer such as Wood Group (formally Mustang Engineering) LNG Smart® Air Vaporizer (SAV) and/or comparable ambient air vaporizer (AAV) system as a secondary and/or primary regasification technology (e.g., less than 250 MMSCFD, equatorial zone, no power generation). In some embodiments, LNG vaporizer system 14 may just include a SCV (combustor off with the option to turn the combustor on) as the primary means of regasification (e.g., between 50 MMSCFD and 450 MMSCFD, subequatorial zone, no power generation). Although particular manufacturers are listed, these are examples and particular embodiments may use any suitable components from any manufacturer.

Some embodiments may include any suitable vaporizer or combination of vaporizers (hybrid platform). For example, some embodiments may include a SCV (combustor off with the option to turn the combustor on) paired with another vaporizer technology. Selection of vaporizer is based on site location, climatic conditions, throughput requirement, and regulatory controls with ever increasing environmental oversight making the REV Accelerated Gas Systems platform compelling.

LNG vaporizer system 14 comprises LNG inlet 74 and natural gas outlet 76. LNG vaporizer system 14 vaporizes LNG received from LNG inlet 74 into natural gas and sends the natural gas downstream via natural gas outlet 76 coupled to distribution pipeline 20 to end-users 85.

LNG vaporizer system 14 comprises thermal liquid inlet 80 and thermal liquid outlet 78. LNG vaporizer system 14 uses heated thermal liquid received from thermal liquid inlet 80 to vaporize the LNG into natural gas. The conversion process removes heat from the heated thermal liquid, resulting in a cooled thermal liquid. The cooled thermal liquid is discharged through thermal liquid outlet 78.

LNG vaporizer system 14 may be mounted on jetty 10. In some embodiments, jetty 10 may be referred to as stable pad 10. An objective of flexible regasification system 5 is to minimize its on-shore footprint. Particular advantages of a smaller near shore footprint are that the flexible components may be constructed in a controlled environment and be deployed and/or re-deployed with ease as required by the project, similar to the FSRU model. In addition, the small footprint intentionally reduces land use, to reduce in country risk and may also simplify the associated permitting process.

Floating LNG storage vessel(s) 16 and floating thermal fluid source vessel(s) 18 are moored in water body 12 proximate to jetty 10. Although FIG. 1 illustrates a particular configuration, other embodiments may comprise any suitable configuration of floating LNG storage vessel(s) 16 and floating thermal fluid source vessel(s) 18. For example, floating thermal fluid source vessel(s) 18 may typically be moored to jetty 10 but may also be anchored at any suitable location in water body 12. Similarly, floating LNG storage vessel(s) 16 may be moored as close as safely possible to jetty 10 (depending on water depth, jetty orientation, etc.).

Floating LNG storage vessel(s) 16 stores and supplies LNG to LNG vaporizer system 14 via LNG supply line 22. Floating storage vessel 16 includes LNG outlet 72. LNG outlet 72 may be coupled to LNG inlet 74 of LNG vaporizer system 14 via LNG supply line 22. Some embodiments may include any suitable number of LNG supply lines 22. LNG supply line 22 may comprise a floating cryogenic hose, or any other suitable supply line for transporting LNG off of the vessel to jetty 10. In particular embodiments, floating LNG storage vessel 16 comprises a conventional LNG storage vessel, such as a first generation 125,000 m³ LNG carrier.

In some embodiments, to provide additional LNG storage, LNG floating storage vessel 16 may be twin berthed and may include a number of appropriately sized fenders (e.g., Yokohama) between LNG floating storage vessels 16. Floating storage vessel(s) 16 receive LNG delivery by a conventional LNG carrier. Particular embodiments may include a number of appropriately sized fenders (e.g., Yokohama) between the conventional LNG delivery vessel and LNG floating storage vessels(s) 16. Floating storage vessel 16 includes sufficient LNG volume per maximum allowable floating storage capacity. LNG cargo lightering from the LNG delivery vessel to LNG floating storage vessel 16 may be performed by cryogenic and vapor hoses via ship-to-ship transfer according to commercially accepted industry practice (e.g., according to SIGTTO guidelines).

Under particular environmental conditions, LNG vaporizer system 14 may rely on external heat to vaporize the LNG. Floating thermal fluid source vessel(s) 18 may supply external heat to LNG vaporizer system 14. Floating thermal fluid source vessel 18 stores and heats a thermal fluid (e.g., water, glycol, brine, etc.) and supplies the heated thermal fluid to LNG vaporizer system 14 via thermal fluid supply line(s) 24. Cooled liquid returns from LNG vaporizer system 14 to floating thermal fluid source vessel 18 via thermal fluid return line(s) 26 where the liquid is reheated, forming a closed-loop system.

Floating thermal source vessel 18 comprises heated thermal fluid outlet 82 and cooled thermal fluid inlet 84. Heated thermal fluid outlet 82 is coupled to thermal fluid inlet of LNG vaporizer system 14 via thermal fluid supply line(s) 24. Cooled thermal fluid inlet 84 is coupled to thermal fluid outlet 78 of LNG vaporizer system 14 via thermal fluid return line(s) 26. Although a single inlet and outlet are illustrated, particular embodiments may include any suitable number of inlets and outlets.

Advantages of the closed-loop system is that it is environmentally-friendly with respect to avoiding open-loop discharged water at higher temperatures and/or waste water management. For example, conventional systems that rely on seawater for heat also discharge cooled water back into the sea, which can raise environmental concerns under some conditions. The closed-loop system avoids these concerns.

In some embodiments, floating thermal fluid source vessel 18 includes one or more heaters 32 to heat the thermal fluid and one or more cargo pumps (also referred to as circulation pumps) to pump the thermal fluid through thermal fluid supply line(s) 24 and/or thermal fluid return line(s) 26.

As a particular example, floating thermal fluid source vessel 18 may comprise a floating asset, such as a Trinity Marine Products, Inc. hot oil barge with 30,000 barrels (42 gallons per barrel) of storage. Each 300 foot length by 54 foot beam barge may store up to 1.26 million gallons of thermal fluid. Floating thermal fluid source vessel 18 is described in more detail with respect to FIG. 4 below.

Some conventional vaporizers, such as a submerged combustion vaporizer (SCV) or other shell & tube configuration, require a heat source that vaporizes the LNG. A problem with these vaporizers is when the thermal fluid bath is heated by direct contact with hot flue gases, which can become acidic as the combustion gas products (i.e., $CO_2$) dissolve into the heated fluid. Caustic chemicals such as sodium carbonate and sodium bicarbonate may be added to the hot fluid bath to control the pH value and to protect the vaporizer unit components against corrosion. The combination of acidic thermal fluid and caustic chemicals, however, may result in a shorter vaporizer (combustor on) unit lifecycle.

A particular benefit of flexible regasification system 5 employing the SCV unit is that the heating element (combustor) for the vaporizer is intended to be secured (i.e., unused), opting instead for the closed-loop thermal fluid source system. The SCV heating element (combustor) may be fired if needed, thus providing vaporizer system redundancy for those situations when floating thermal fluid source vessel 18 is nonoperational, such as during repairs or maintenance, or for safety reasons as an additional layer of protection for process upsets. In these scenarios, the SCV combustor is operated with due regard for waste water containment and/or management.

In some embodiments, floating thermal fluid source vessel 18 includes gas fired heaters 32 for heating the thermal fluid stored in thermal fluid storage tanks 36 via heating coils 34. Floating thermal fluid source vessel 18 may use natural gas fired heaters 32 using natural gas from gas supply line 28 coupled to distribution pipeline 20 to end-users 85.

Particular embodiments may also capture boil-off-gas from floating LNG vessel 16 to gas fire the heaters 32 of the floating thermal fluid source vessel 18. For example, floating LNG vessel 16 may comprise boil-off gas outlet 86 coupled to boil-off-gas line 29, which may direct boil-off-gas from floating LNG storage vessel 16 to gas supply line 28 for direct use by heaters 32 of floating thermal fluid source vessel 18.

A particular advantage of flexible regasification system 5 is that boil-off-gas is reused to power other components of the flexible regasification system 5 (e.g., onboard floating LNG storage vessel(s) 16, power generation and/or floating thermal fluid source vessel(s) 18, gas fired heaters 32, and circulation pumps) which improves boil-off-gas optimization with a low carbon footprint for boil-of-gas that would otherwise be flared.

Some embodiments include a high pressure emergency flare unit 38 for LNG vapor flare control. If the heaters 32 of the floating thermal fluid source vessel(s) 18 are unable to be fired and use all of the boil-off-gas inclusive of (acting as a GCU) the primary flare control mode (e.g., gas fired heaters 32 are shut down for repair or maintenance), then the emergency high pressure flare 38 may be deployed.

Emergency high pressure flare 38 is safely located away from LNG vaporizer system 14 and floating LNG storage vessel(s) 16. In particular embodiments, the emergency high pressure flare 38 is installed at any suitable location proximate to the floating thermal fluid source vessel(s) 18, tied into the boil-off-gas pipeline 29, and installed at water body 12 on jetty 10.

In particular embodiments, flexible regasification system 5 may include any suitable number of vaporizers in LNG vaporizer system 14 and any suitable number of floating thermal fluid source vessel(s) 18 to create a desired natural gas throughput. For example, one floating thermal fluid source vessel(s) 18 provides sufficient heat/vaporizer unit inflow temperature (e.g., set at approximately 108° F.) to heat the thermal fluid, with circulation driven by the pump(s) and ample heating as provided by the requisite heater(s) 32. The number of heater(s) 32 may be determined on the basis of the heat requirement (Mmbtu/hr) with regard to desired heater unit efficiency (e.g. 88%) with thermostatic control which will be sized appropriately to provide adequate heat as required for LNG vaporizer 14 as paired with floating thermal fluid source vessel(s) 18 capable of delivering up to 50 MMSCFD, scalable to 450 MMSCFD with a turn down capability of 10.5% (7% of 1500 MMSCFD) of the natural gas send out.

A particular advantage of flexible regasification system 5 is that it may be scaled up or down by adding or removing modular components, such as LNG vaporizer system 14 and/or floating thermal fluid source vessel(s) 18. Additionally, because floating thermal fluid source vessel(s) 18 and floating LNG storage vessel(s) 16 are mobile, and LNG vaporizer system 14 has a minimal footprint, the entire flexible regasification system 5 may be deployed or relocated with minimal effort and expense versus land based facilities, similar to the FSRU model.

Figure 2:
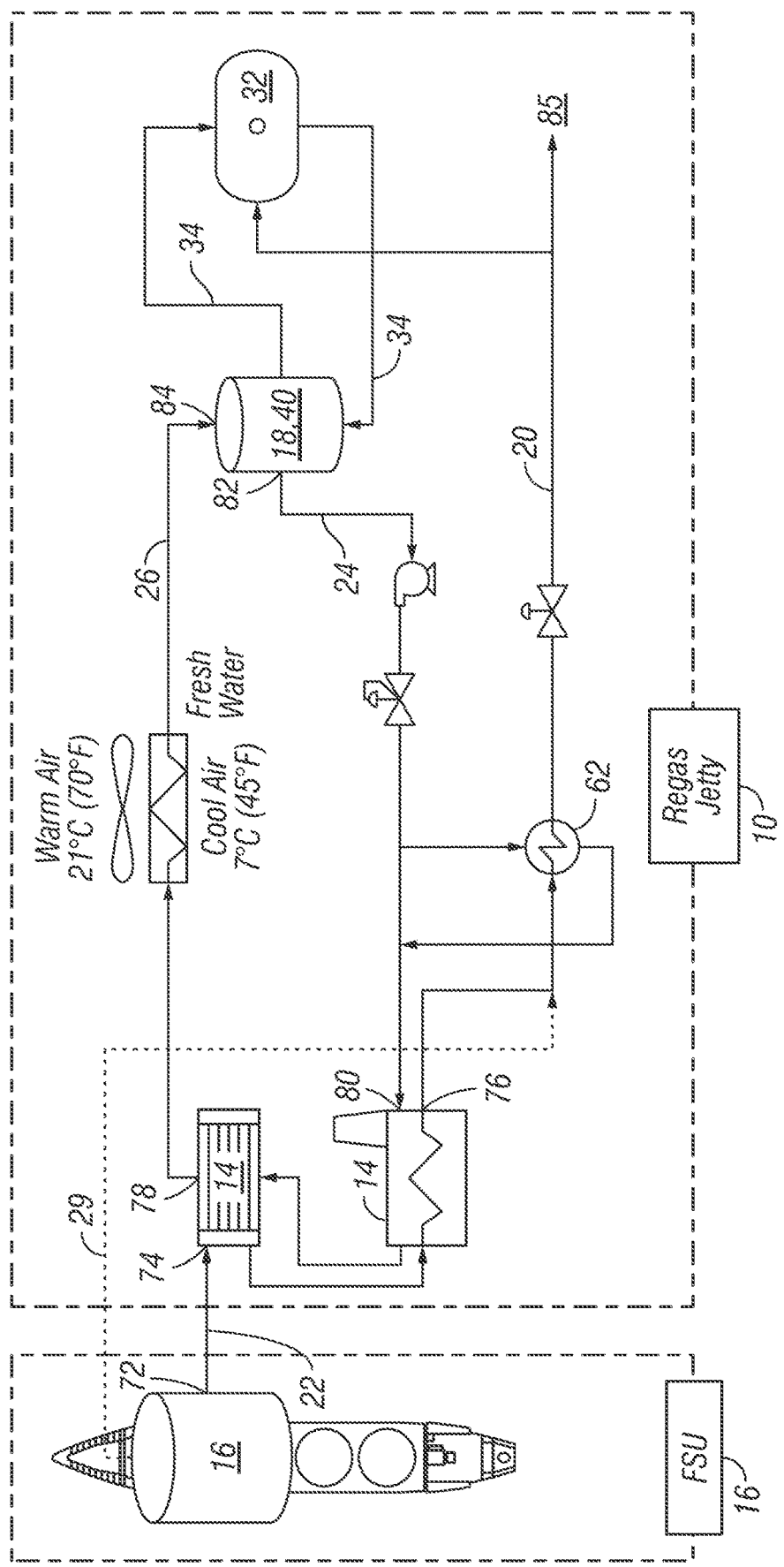
FIG. 2 is a block diagram illustrating an example flexible regasification system with ambient air vaporizer (AAV) and/or submerged combustion vaporizer (SCV) for the equatorial zone with no power generation, according to some embodiments.

FIG. 2 is a block diagram illustrating an example flexible regasification system option for the equatorial zone with no power generation, according to some embodiments. FIG. 2 is a particular example of the components illustrated in FIG. 1. Flexible regasification system 5 includes vaporizers 14, such as a SCV (combustor off with the option to turn the combustor on) coupled with a Wood Group (formally Mustang Engineering) LNG Smart® Air Vaporizer (SAV) and/or comparable ambient air vaporizer (AAV) system, as a secondary and/or primary regasification technology (e.g., less than 250 MMSCFD, equatorial zone, no power generation).

Figure 3:
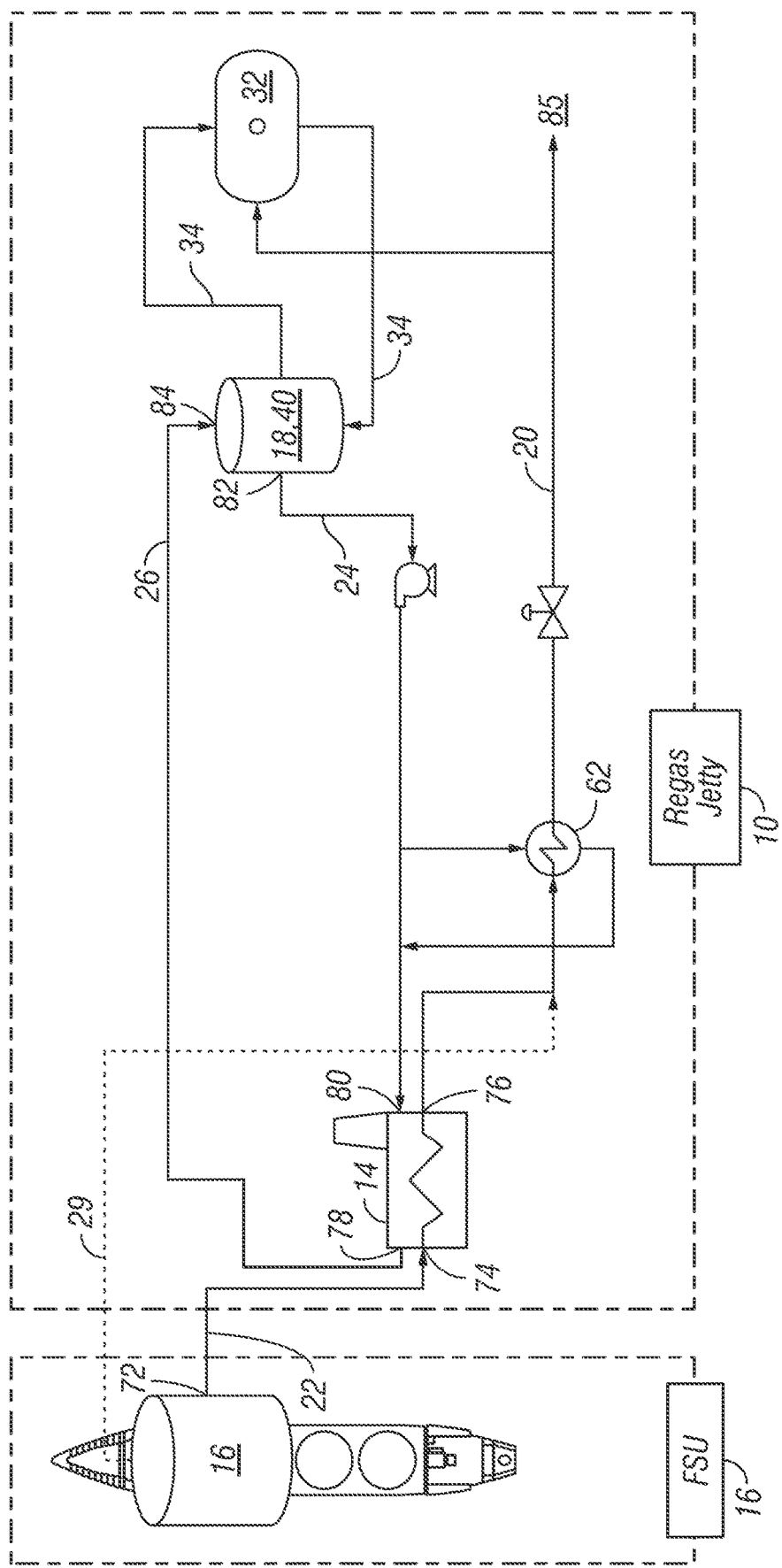
FIG. 3 is a block diagram illustrating an example flexible hybrid regasification system with SCV unit for the subequatorial zone with no power generation, according to some embodiments.

FIG. 3 is a block diagram illustrating an example flexible hybrid regasification system with SCV unit for the subequatorial zone with no power generation, according to some embodiments. FIG. 3 is a particular example of the components illustrated in FIG. 1. Flexible regasification system 5 includes vaporizers 14, such as a (SCV) (combustor off with the option to turn the combuster on), as the primary means of regasification (e.g., greater than 50 MMSCFD, less than 450 MMSCFD, subequatorial zone, no power generation).

FIG. 4 is a block diagram illustrating an example floating thermal fluid source vessel, according to a particular embodiment. Floating thermal fluid source vessel 18 includes vessel hull 30. In the illustrated embodiment, heater 32 is located on the deck of vessel hull 30. Located within vessel hull 30 are thermal fluid storage tanks 36. Heater 32 raises the temperature of the thermal medium "oil" that flows throughout heating coils 34 in an internal closed-loop system. The thermal medium "oil" flowing through the heating coils 34, heats the thermal fluid stored in the thermal fluid storage tank(s) 36. Heater 32 and heating coils 34 form an internal closed-loop system onboard floating thermal fluid source vessel 18.

In particular embodiments, floating thermal fluid source vessel 18 includes the requisite number of heaters 32 for required LNG vaporization and natural gas send out. In particular embodiments, heater 32 operates with high efficiency (e.g., 88%). If air permitting regulations dictate lower NOx emissions, a Selective Catalytic Reduction (SCR) unit may be integrated into flexible regasification system 5.

In particular embodiments, thermal fluid storage tanks 36 may be insulated. For example, hull voids around thermal fluid storage tanks 36 may be coated with a spray-on insulating material (and/or comparable thermal energy containment insulation system) to more efficiently maintain the temperature of the thermal fluid stored in thermal fluid storage tanks 36.

Figure 5:
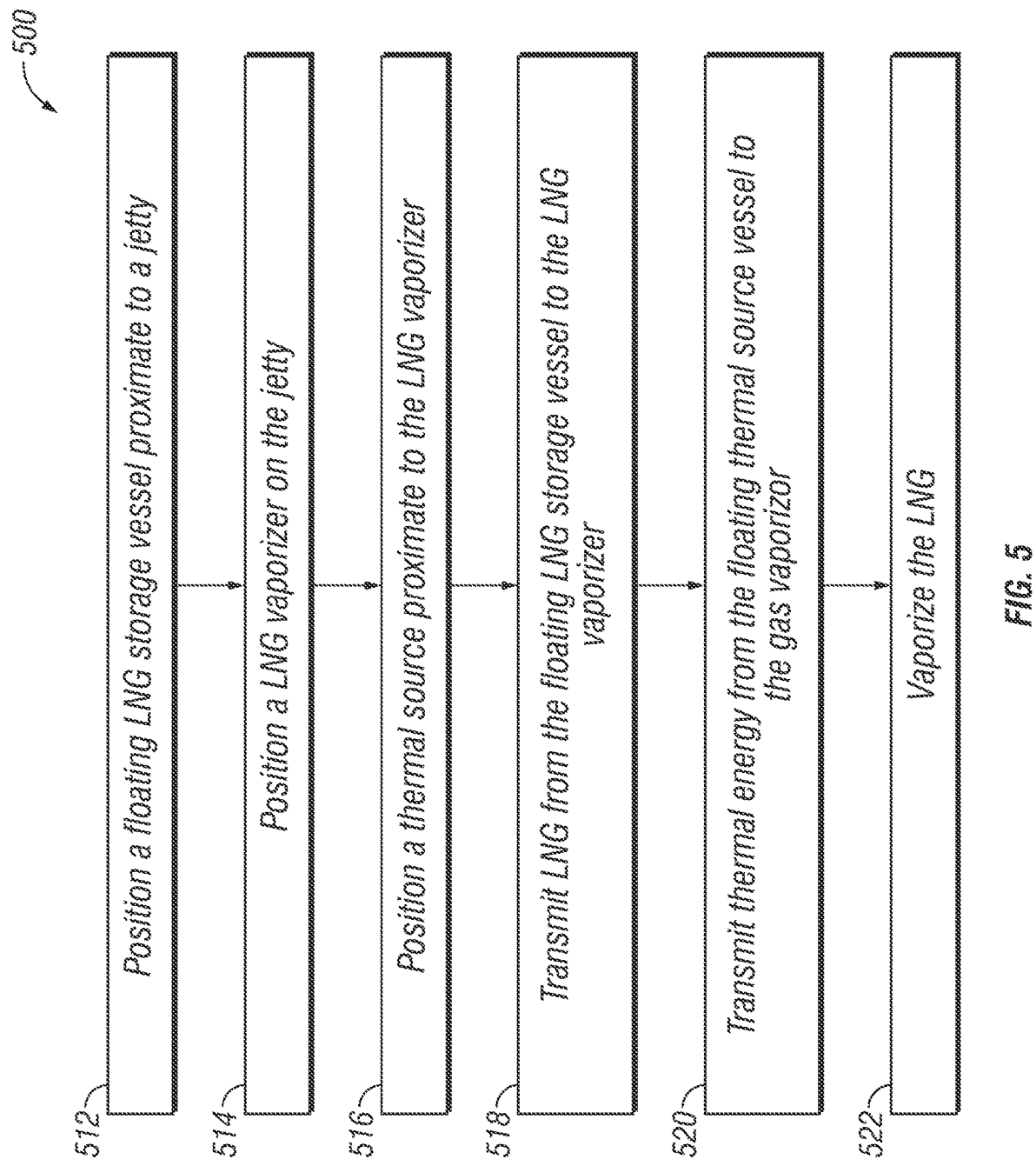
FIG. 5 is a flow diagram illustrating an example method of regasifying a liquefied gas, according to some embodiments.

FIG. 5 is a flow diagram illustrating an example method of regasifying LNG, according to some embodiments. In particular embodiments, one or more steps of method 500 may be performed using the components described with respect to FIG. 1.

The method begins at step 512, whereby a floating LNG (liquefied natural gas) storage vessel is positioned proximate to a jetty or pad. For example, floating LNG storage vessel 16 may be moored near jetty 10, as described with respect to FIG. 1. Particular embodiments may include more than one floating LNG storage vessel 16, depending on the LNG output requirements of flexible regasification system 5.

At step 514, a LNG vaporizer system is positioned on the jetty or pad. For example, LNG vaporizer system 14 may be mounted on jetty 10, as described with respect to FIG. 1.

At step 516, a thermal fluid source is positioned proximate the LNG vaporizer. For example, floating thermal fluid source vessel 18 may be moored near jetty 10, as described with respect to FIG. 1. Particular embodiments may include more than one thermal fluid source, depending on the capacity and number of vaporizers included in LNG vaporizer system 14. Some embodiments may include a thermal fluid source positioned on the jetty, such as the thermal fluid source described with respect to FIGS. 6 and 7.

At step 518, LNG is pumped from the floating LNG storage vessel(s) to the jetty or pad mounted LNG vaporizer. For example, LNG may be pumped from floating LNG storage vessel(s) 16 to LNG vaporizer system 14 on jetty 10, as described with respect to FIG. 1.

At step 520, thermal energy is circulated from the thermal fluid source to the jetty or pad mounted LNG vaporizer. For example, thermal fluid may be pumped from floating thermal fluid source vessel(s) 18 to LNG vaporizer system 14 on jetty 10, as described with respect to FIG. 1. In some embodiments, thermal fluid may be pumped from a thermal fluid source positioned on the jetty, such as the thermal fluid source described further below with respect to FIGS. 6 and 7.

At step 522, the LNG is vaporized. For example, LNG vaporizer system 14 may use the thermal energy from floating thermal fluid source vessel(s) 18 to vaporize the liquefied gas from floating LNG vessel(s) 16.

Modifications, additions, or omissions may be made to the method of FIG. 5. Additionally, one or more steps in method 500 of FIG. 5 may be performed in parallel or in any suitable order. The steps of method 500 may be repeated any suitable number of times. Although particular steps of method 500 are described with respect to FIG. 1, the steps may also be performed with respect to the flexible regasification system described below with respect to FIGS. 6, 8, and 9.

Figure 6:
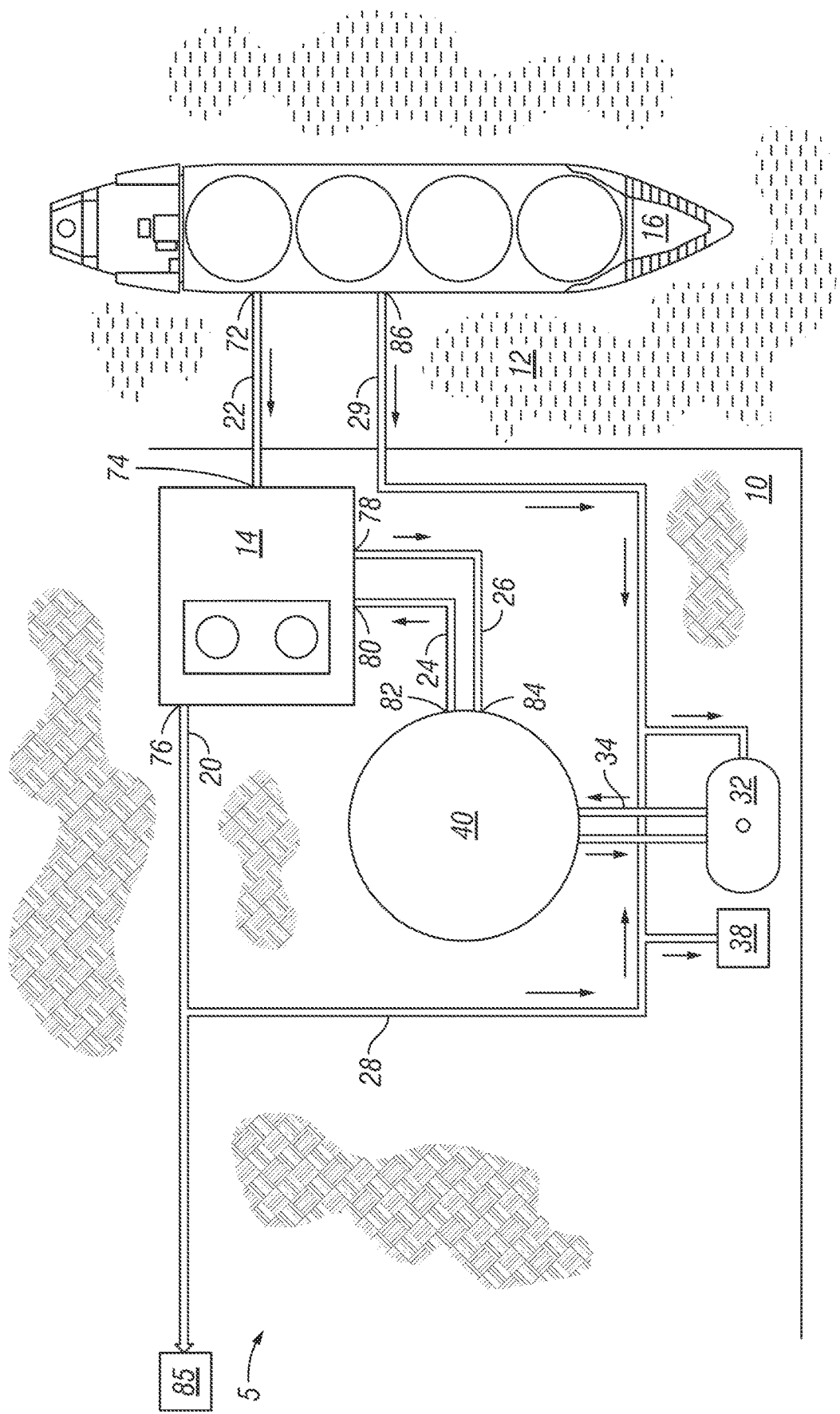
FIG. 6 is a block diagram illustrating an example of a flexible regasification system with a non-floating thermal fluid source, according to some embodiments.

FIG. 6 is a block diagram illustrating an example of a flexible regasification system with a non-floating thermal fluid source, according to some embodiments. Flexible regasification system 5 is similar to flexible regasification system 5 illustrated in FIG. 1, except floating thermal fluid source vessel 18 is replaced with non-floating thermal fluid source 40. Under certain conditions (e.g., lack of frontage, open seaway, etc.), deploying floating thermal fluid source vessel 18 may be undesirable or impossible. Accordingly, some embodiments include non-floating thermal fluid source 40 as shown in FIG. 6.

Figure 7:
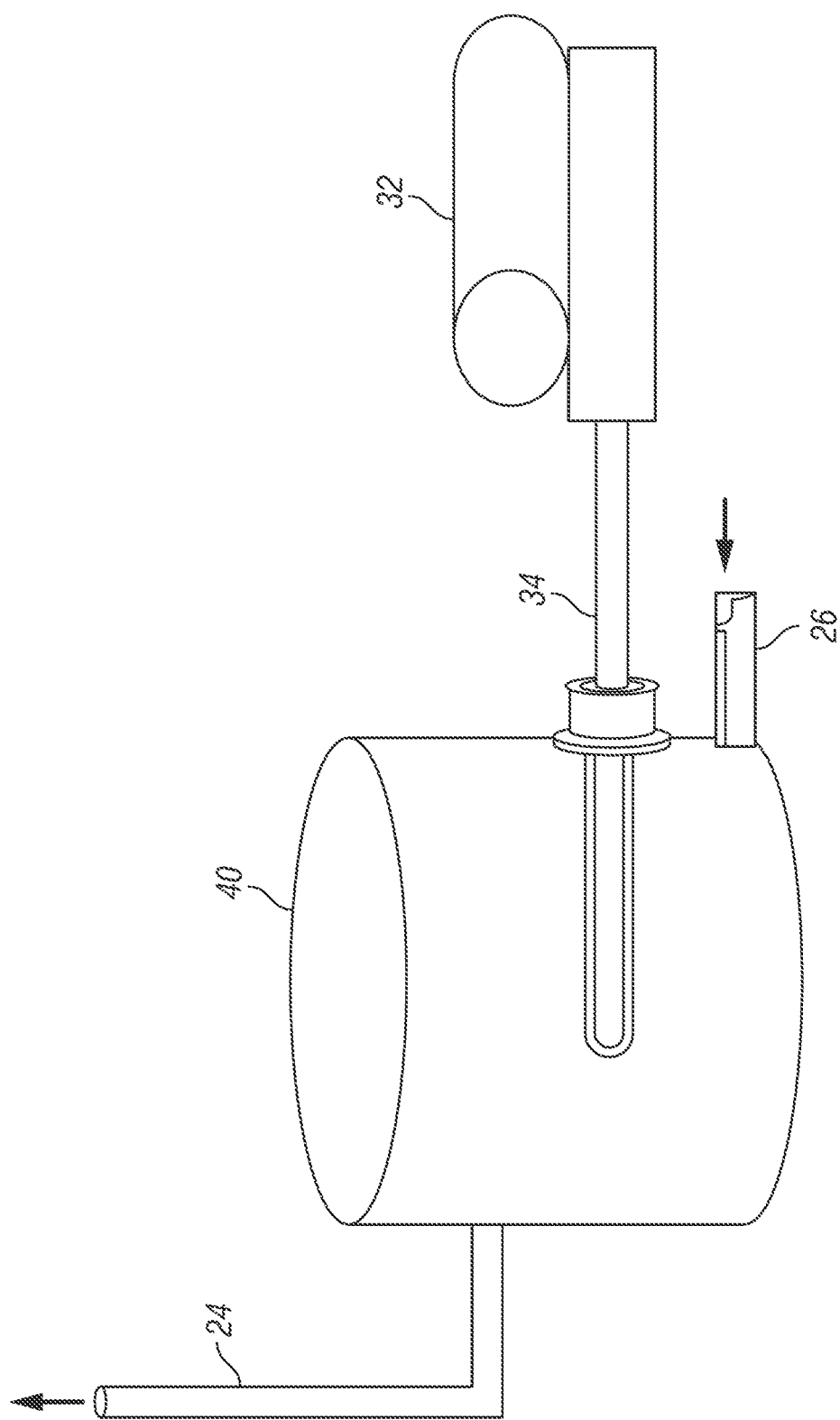
FIG. 7 is a block diagram illustrating an example non-floating thermal fluid source, according to a particular embodiment.

Non-floating thermal fluid source 40 comprises one or more liquid thermal fluid storage tanks and one or more heat sources as shown in FIG. 7. In some embodiments, non-floating thermal fluid source 40 comprises at least one 30,000 barrel standalone thermal fluid storage tank (e.g., water, glycol, brine, etc.) with gas fired heaters and internal closed-loop system heating coils 34 similar to those described with respect to the floating thermal energy source vessel of FIG. 4.

FIG. 7 is a block diagram illustrating an example non-floating thermal fluid source, according to a particular embodiment. Non-floating thermal fluid source 40 may supply external heat to LNG vaporizer system 14. Non-floating thermal fluid source 40 stores and heats a thermal fluid liquid (e.g., water, glycol, brine, etc.) and supplies the heated thermal fluid to LNG vaporizer system 14 via thermal fluid supply line(s) 24. The cooled thermal fluid returns from the LNG vaporizer system 14 to non-floating thermal fluid source 40 via thermal fluid return line(s) 26 where the thermal fluid is reheated, forming a closed-loop system.

In particular embodiments, non-floating thermal fluid source (e.g., storage tank) 40 may be insulated. For example, exterior walls may be coated with a spray-on insulating material (and/or comparable thermal energy containment insulation system) to more efficiently maintain the temperature of the thermal fluid stored in a non-floating thermal fluid source 40.

Advantages of the system include increased efficiency, boil-off-gas management and primary flare control without conventional flaring (except in emergencies) for a closed-loop (thermal fluid) system, without waste water. Hot water discharge issues and primary flare control (e.g., with Volcanic heater(s) acting as Gas Combustion Unit(s) (GCU)) are operated in an environmentally friendly way with a low carbon footprint. For example, the cooled thermal fluid may be optimized for cooled thermal reuse facility 54 instead of discharging water into water body 12 in an open loop system. In some embodiments, non-floating thermal source 40 includes one or more heaters 32 to heat the thermal fluid source and one or more circulation pumps to pump the thermal fluid through the thermal fluid supply line(s) 24 and/or thermal fluid return line(s) 26.

In some embodiments, non-floating thermal fluid source 40 may include gas powered heater(s) 32 for heating the thermal fluid. Non-floating thermal fluid source 40 may receive the gas for powering its heater(s) 32 from gas supply line 28 coupled to gas distribution pipeline 20 and boil-off-gas pipeline 29.

Particular embodiments may capture boil-off-gas from floating LNG storage vessel 16 via boil-off-gas pipeline 29 to power the gas heater(s) 32 of the non-floating thermal fluid source 40. For example, boil-off-gas line 29 may direct boil-off-gas from floating LNG storage vessel 16 to heater(s) 32 of non-floating thermal fluid source 40.

A particular advantage of flexible regasification system 5 is that boil-off-gas is reused to power other components of flexible regasification system 5. For example, boil-off gas from floating LNG storage vessel 16 may be used to power components of non-floating thermal fluid source 40 systems (e.g., gas fired heaters 32 (inclusive of GCU mode), circulation pumps and generators), which improves boil-off-gas optimization with a low carbon footprint for boil-of-gas that would otherwise be flared.

In some embodiments, flexible regasification system 5 may include heat exchanger 62. In some embodiments, heat exchanger 62 may comprise a heater. Heat exchanger 62 heats natural gas coming out of LNG vaporizer system 14. For example, some gas pipeline companies may specify a particular gas pipeline temperature for natural gas entering the gas distribution pipeline to end-users 85. Heat exchanger 62 may receive heat from the thermal fluid in thermal fluid supply line 24 to heat the natural gas to the desired gas pipeline specification coming out of LNG vaporizer system 14.

An advantage of the flexible regasification system 5 described with respect to FIGS. 1-7 is that the cooled thermal fluid in the closed-loop system may be reused for other co-located industrial processes. In particular embodiments, the cooled thermal fluid returning from the LNG vaporizer system may be managed and/or sold as an LNG cryogenic energy commodity, which results in thermal energy optimization.

For example, cooled thermal fluid energy may be used by a nearby cold storage warehouse/refrigeration plant, commercial/industrial (e.g., frozen food/fish, refrigerated produce or data center/power plant, power trigeneration, gas reciprocating units, district cooling, etc.), which may purchase the cooled thermal fluid for use in its refrigeration lines before returning the thermal fluid back to floating thermal fluid source vessel(s) 18 and/or non-floating thermal fluid source 40, whereby trim heat is applied by natural gas fired heater(s) 32 and recirculated to the SCV unit (combustor off) 14 to provide LNG vaporization.

As an industrial example, a gas fired turbine/power generation plant 54 may commonly be collocated near flexible regasification system 5. The gas fired turbine/power generation plant may use cooled thermal fluid line 26 for chilling and/or cooling some of its power plant machinery and equipment (e.g., gas turbine air inlet chilling and/or condenser cooling).

Figure 8:
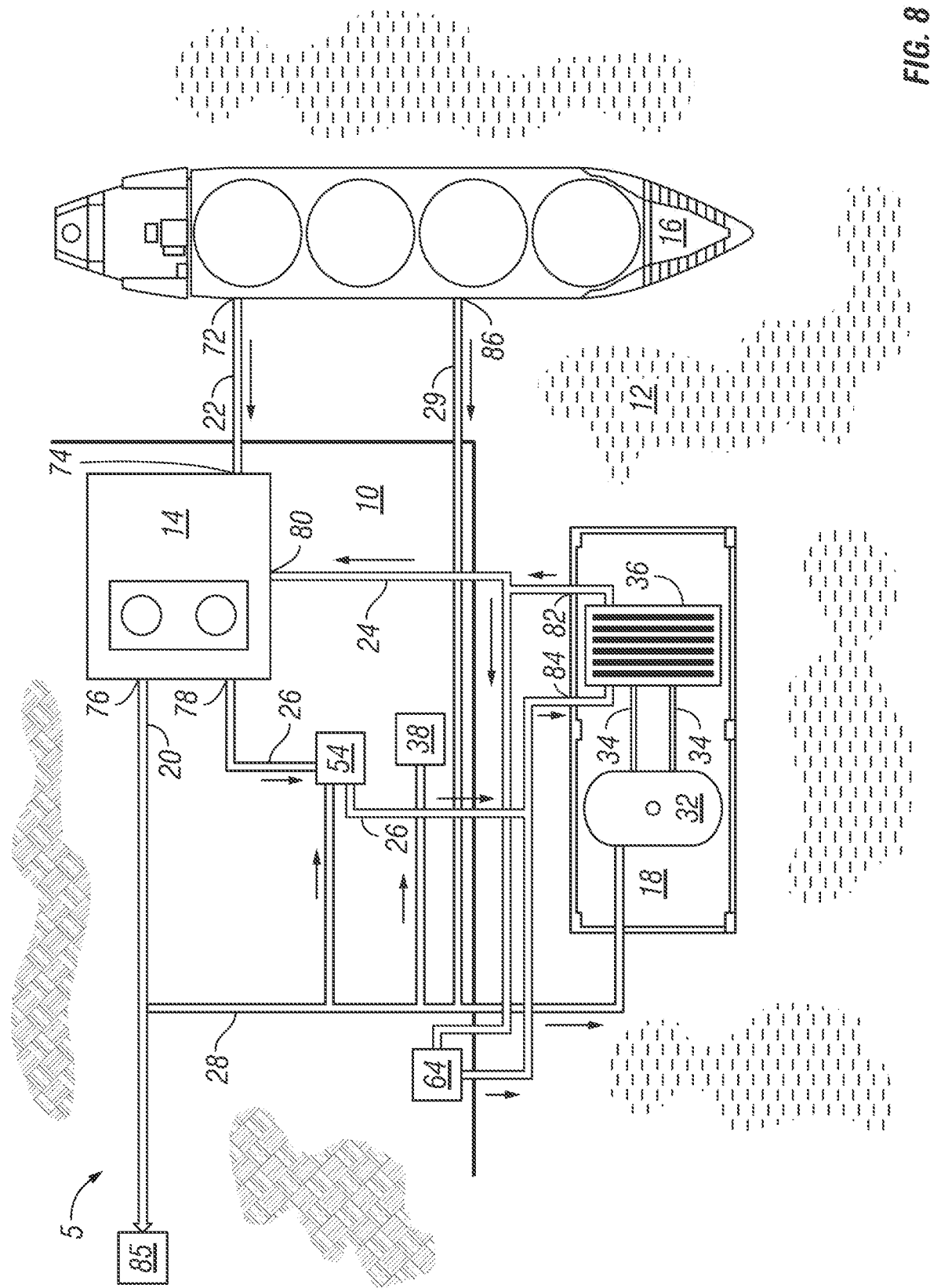
FIG. 8 is a block diagram illustrating an example of a flexible regasification system with a floating thermal fluid source vessel and hot and cold thermal fluid reuse facilities, according to some embodiments.

FIG. 8 is a block diagram illustrating an example of a flexible regasification system with a floating thermal fluid source vessel and hot and cold thermal fluid reuse facilities, according to some embodiments. The cooled thermal fluid from the jetty mounted gas vaporization system may comprise a LNG cryogenic energy commodity reused and optimized for a collocated industrial application. Flexible regasification system 5 is similar to flexible regasification system 5 as illustrated in FIGS. 1-7. In addition, flexible regasification system 5 also includes cooled thermal fluid reuse and optimization for cold thermal fluid reuse facility 54, and hot thermal fluid reuse and optimization for hot thermal fluid reuse facility 64.

Cold thermal fluid reuse facility 54 is located along thermal fluid return line 26, whereby cooled thermal fluid returns from LNG vaporizer system 14 to floating thermal fluid source vessel(s) 18. Cold thermal fluid reuse facility 54 uses the cooled thermal fluid before returning the thermal fluid to the floating thermal fluid source vessel(s) 18.

In particular embodiments, jetty 10 may comprise a stable 200 foot by 90 foot concrete jetty or pad. Although cold thermal fluid reuse facility 54 is illustrated as a box on jetty 10 for ease of illustration, Cold thermal fluid reuse facility 54 may be co-located any suitable distance from jetty 10 (e.g., distance determined by properties of the cooled thermal fluid such as the type of thermal fluid and required temperature range from LNG vaporizer system 14 to floating thermal fluid source vessel(s) 18). For example, cold thermal fluid reuse facility 54 may comprise a power generation plant, refrigeration plant, data center, district cooling source, etc.

In particular embodiments, floating thermal fluid source vessel 18 heats the thermal fluid (e.g., to approximately 108° F.), which LNG vaporizer system 14 uses for LNG vaporization (e.g., SCV unit (combustor off)). Other embodiments may use any suitable temperature to optimize the vaporization process based on the particular vaporization equipment.

In some embodiments, the vaporization process may result in a cooled thermal fluid (e.g., of approximately 40° F.). Cold thermal fluid reuse facility 54 (e.g., gas fired turbine/power generation plant) may use the cooled thermal liquid in any of its processes.

The process(es) of cold thermal fluid reuse facility 54 will add rejected heat to the thermal fluid, therefore increasing the temperature (e.g., from 40 degree F.) to a higher temperature. If excessive heat is generated, then an absorption chiller can act as a trim cooler.

Accordingly, a particular advantage is that heater(s) 32 of thermal fluid source vessel 18 may require less trim heat (i.e., less thermal heat energy to reheat the thermal fluid back to the desired hot temperature) if the aforementioned industrial/commercial process of cold thermal fluid reuse is employed, versus a closed-loop recirculation configuration direct from LNG vaporizer system 14 to floating thermal fluid source vessel 18.

Flexible thermal fluid source vessel(s) 18 may be used for hot thermal fluid reuse facility 64. For example, the hot thermal fluid may be optimized for hot thermal reuse facility 64 instead of discharging water into water body 12 in an open loop system. Heated thermal fluid outlet 24 is coupled to the inlet of hot thermal fluid reuse facility 64. Cooled thermal fluid from hot thermal fluid reuse facility 64 is then coupled with thermal fluid return line 26. Although hot thermal fluid reuse facility 64 is illustrated as a box on jetty 10 for ease of illustration, hot thermal fluid reuse facility 64 may be co-located any suitable distance from jetty 10. The hot thermal fluid may be used for steam generation, hot water production, industrial processes requiring heat (e.g. industrial washing, food processing, desalination, etc.), district heating, or any other suitable process using a hot thermal fluid.

Figure 9:
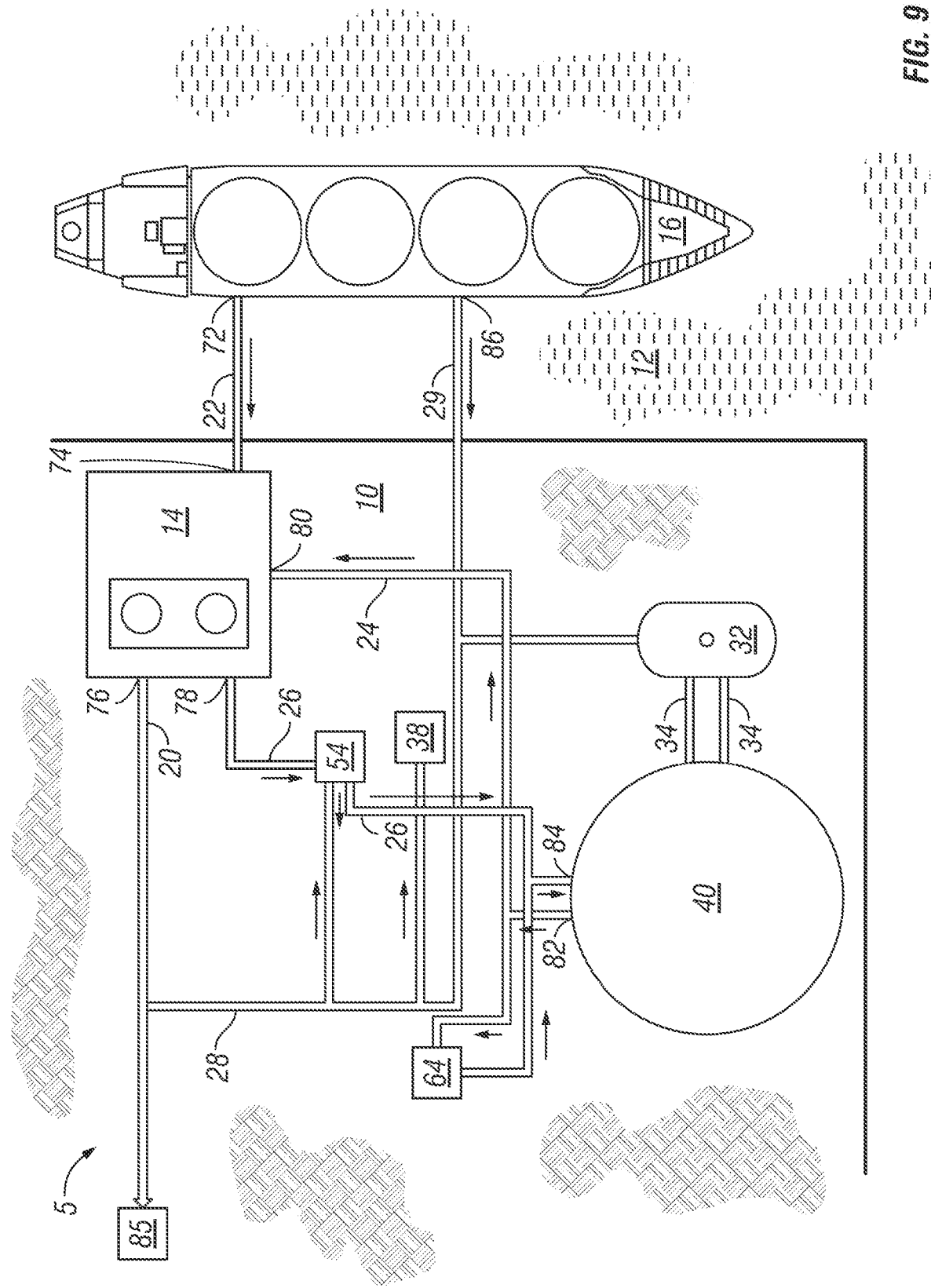
FIG. 9 is a block diagram illustrating an example of a flexible regasification system with a non-floating thermal fluid source and hot and cold thermal fluid reuse facilities, according to some embodiments.

FIG. 9 is a block diagram illustrating an example of a flexible regasification system with a non-floating thermal fluid source and hot and cold thermal fluid reuse facilities, according to some embodiments. Flexible regasification system 5 is similar to flexible regasification system 5 illustrated in FIG. 8, except floating thermal fluid source vessel 18 is replaced with non-floating thermal fluid source 40. Under certain conditions (e.g., lack of frontage, open seaway, etc.), deploying floating thermal fluid source vessel 18 may be undesirable or impossible. Accordingly, some embodiments include non-floating thermal fluid source 40 as shown in FIG. 9.

Cold thermal fluid reuse facility 54 is located along thermal fluid return line 26, whereby cooled thermal fluid returns from LNG vaporizer system 14 to non-floating thermal fluid source 40. Cold thermal fluid reuse facility 54 uses the cooled thermal fluid before returning the thermal fluid to non-floating thermal fluid source 40.

In particular embodiments, jetty 10 may comprise a stable 200 foot by 90 foot concrete jetty or pad. Although cold thermal fluid reuse facility 54 is illustrated as a box on jetty 10 for ease of illustration, cold thermal fluid reuse facility 54 may be co-located any suitable distance from jetty 10 (e.g., distance determined by properties of the cooled thermal fluid such as the type of thermal fluid and required temperature range from LNG vaporizer system 14 to non-floating thermal fluid source 40). For example, cold thermal fluid reuse facility 54 may comprise a power generation plant, refrigeration plant, data center, district cooling source, etc.).

Accordingly, a particular advantage is that heaters 32 of non-floating thermal fluid source 40 may require less trim heat (i.e., less thermal heat energy to reheat the thermal fluid back to the desired hot temperature), if the aforementioned industrial/commercial process of cooled thermal fluid reuse is employed, versus a closed-loop recirculation configuration direct from LNG vaporizer system 14 to non-floating thermal fluid source 40.

Figure 10:
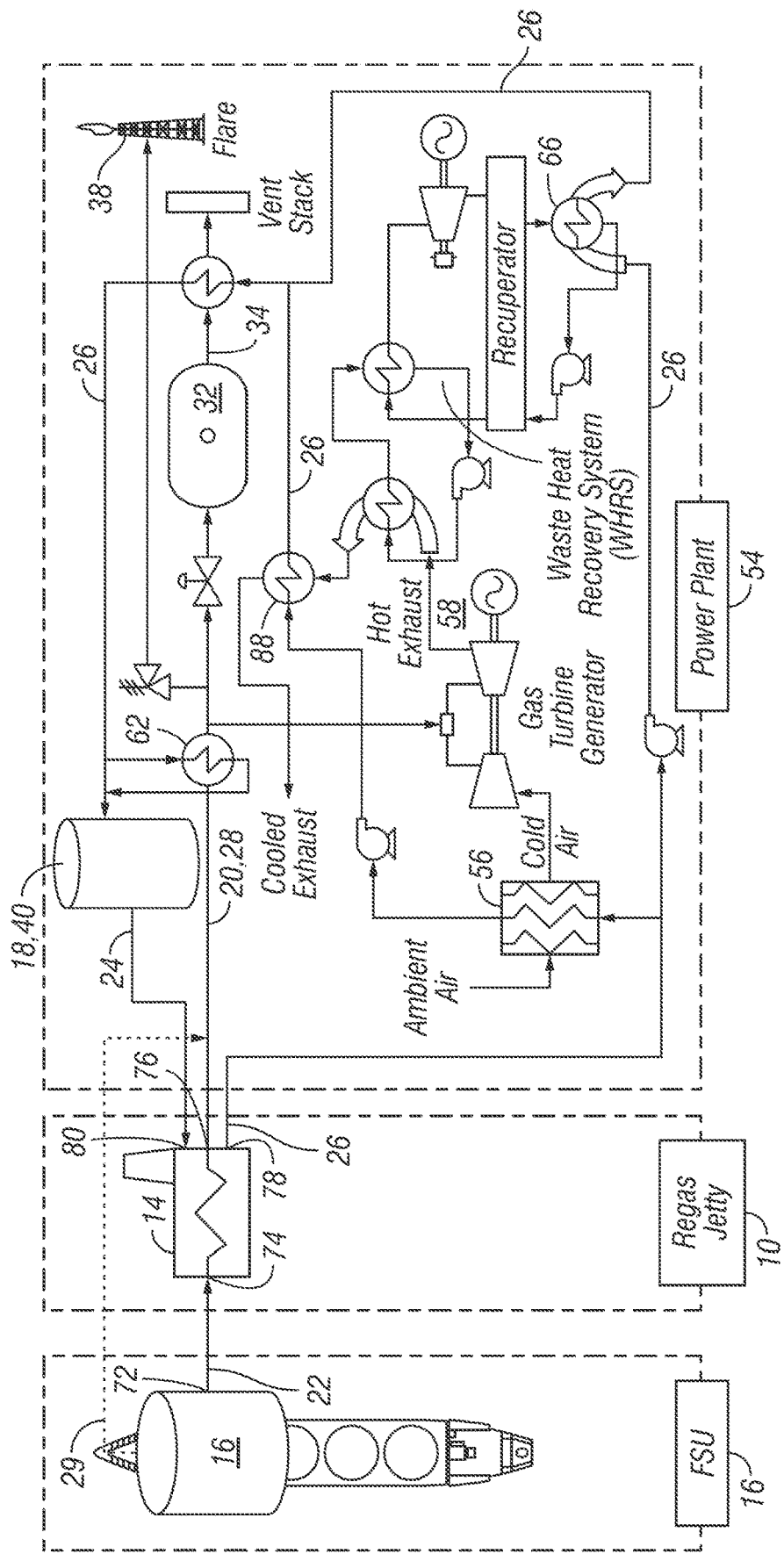
FIG. 10 is a block diagram illustrating an example gas fired turbine power generation system reusing cold thermal fluid from a flexible regasification system, according to some embodiments.

Non-floating thermal fluid source 40 may be used for hot thermal fluid reuse facility 64. For example, the hot thermal fluid may be optimized for hot thermal reuse facility 64 instead of discharging water into water body 12 in an open loop system. Heated thermal fluid outlet 24 is coupled to the inlet of hot thermal fluid reuse facility 64. Cooled thermal fluid from hot thermal fluid reuse facility 64 is then coupled with thermal fluid return line 26. Although hot thermal fluid reuse facility 64 is illustrated as a box on jetty 10 for ease of illustration, hot thermal fluid reuse facility 64 may be co-located any suitable distance from jetty 10. The hot thermal fluid may be used for steam generation, hot water production, industrial processes requiring heat (e.g. industrial washing, food processing, desalination), and district heating FIG. 10 is a block diagram illustrating an example gas fired turbine power generation system reusing thermal fluid from a flexible regasification system, according to some embodiments. The gas fired turbine/power generation plant is an example of cold thermal fluid reuse facility 54 illustrated in FIG. 8. In particular embodiments, the gas fired turbine/power generation system may comprise a REV Gas2Wire system.

Gas fired turbine/power generation system 54 includes a gas turbine generator with inlet air chiller 56 and/or condenser 66. Gas fired turbine/power generation system 54 receives cooled thermal fluid from thermal fluid return line 26 and distributes the cooled thermal fluid to the gas turbine generator inlet air chiller 56 and/or condenser 66. Gas fired turbine/power generation system 54 operates most efficiently in accordance with specified original equipment manufacturer (OEM) approved gas turbine air inlet chilling as required for maximum rated power megawatt (MW) output, irrespective of ambient air temperature.

In particular embodiments, the optimal OEM recommend/international standards organization (ISO) standard gas turbine air inlet temperature is 59° F., which may be well below the ambient air temperature, thus supplemental gas turbine air inlet chilling may achieve the ISO standard maximum efficient rated power MW output.

Gas fired turbine/power generation plant 54 includes inlet air chiller 56. Inlet air chiller 56 uses the cooled thermal fluid to chill the ambient gas turbine inlet air to the optimal OEM recommend/ISO standard temperature of 59° F. for the gas fired turbine/power generation plant 58.

Condenser 66 uses the cooled thermal fluid in the waste heat recovery system (WHRS). Cooled thermal fluid return line 26 transports the cooled thermal fluid from gas fired turbine inlet air/power generation plant 54 back to floating thermal fluid source vessel(s) 18 and/or non-floating thermal fluid source 40 for trim heat application.

In particular embodiments, gas fired inlet turbine/power generation plant 54 may add heat to the thermal fluid liquid, which increases overall thermal efficiency as the floating thermal fluid source vessel(s) 18 and/or non-floating thermal fluid source 40 require less trim heat Mmbtu/hr. (e.g., thermal heat energy to reheat the thermal fluid back to the desired hot temperature) versus closed-loop recirculation configuration direct from LNG vaporizer system 14 to floating thermal fluid source vessel(s) 18 and/or non-floating thermal fluid source 40.

Particular embodiments include software for system design and for system operation. For example, particular embodiments may manage exhaust waste heat to increase and/or decrease MW power output. Some embodiments may increase or decrease gas fired thermal trim heat (Mmbtu/hr) with consideration for increasing and/or decreasing available LNG cryogenic thermal energy for gas turbine inlet chilling and/or condenser cooling for maximum power performance and efficiency.

Particular embodiments include thermal reuse facility optimization with regard for boil-off-gas management and/or minimal primary flare control with heaters (acting as a GCU) based on particular project proponent priorities (e.g., safety, efficiency, maintenance and/or optimum commercial operation). Factors such as ambient air temperature, power load factor, commodity prices (e.g., kW-hr or LNG Mmbtu price, thermal energy values, etc.) may determine appropriate thermal energy output balance (i.e., optimization) for the parameters described above.

Some conventional vaporization systems 14 may use waste heat from nearby gas fired power plants 54 in an attempt to create an environmentally-friendly solution. Coordinating the exhaust waste energy output with the power plant facility with a LNG storage and regasification terminal can be a complex process. Thus, a particular advantage of the closed-loop thermal energy output optimization system as provided by the particular embodiments of the flexible floating thermal fluid source vessel(s) 18 and/or non-floating thermal fluid source 40, essentially acting as Thermal Energy Storage (TES) for a highly efficient, intermediary thermal energy management system. Software may coordinate and optimize thermal energy output irrespective of variable centralized power plant facility load and/or output factors, or a LNG storage and regasification terminal's natural gas send out demand profile with efficient thermal energy output optimization between both entities.

Flexible thermal fluid source vessel(s) 18 and/or non-floating thermal fluid source 40 may be used for hot thermal fluid reuse facility 64. For example, the hot thermal fluid may be optimized for hot thermal reuse facility 64 instead of discharging water into water body 12 in an open loop system. Heated thermal fluid outlet 24 is coupled to the inlet of hot thermal fluid reuse facility 64. Cooled thermal fluid from hot thermal fluid reuse facility 64 is then coupled with thermal fluid return line 26. The hot thermal fluid may be used for steam generation, hot water production, industrial processes requiring heat (e.g. industrial washing, food processing, desalination), and district heating.

"REV Accelerated Gas Systems & REV Gas2Wire" co-located/integrated platforms efficiently optimize the recirculated closed thermal fluid loop (hot and cool) as part of the industrial process whereby the highest safety standards, reliability and efficiency are maintained. Inflow heated thermal fluid 24 to SCV unit (combustor off) 14 (e.g., coming in at approximately 108° F.) for LNG vaporization yields cooled thermal fluid outflow 26, which may be used for the air inlet chilling and/or condenser cooling (e.g., waste heat recovery system (WHRS)).

The system will plan to produce cooled thermal fluid output 26 (e.g., with temperature of approximately 40° F.) from SCV unit (combustor off) 14, which will be diverted to manage air inlet chilling and/or condenser cooling (e.g., WHRS) in an efficient, environmentally-friendly way. The closed-loop system maximizes flexibility with significantly lower capital and operating expenses.

Significant efficiencies with respect to power generation are realized whenever REV Gas2Wire (gas fired turbine power generation) is collocated with the primary REV Accelerated Gas System closed-loop regasification system because of the cooler thermal fluid SCV unit (combustor off) 14 cooled thermal fluid outflow 26 (e.g., with temperature of approximately 40° F.) optimization. Trim heat is controlled and maintained by natural gas fired heaters 32 and/or hot thermal fluid pump circulation in synchronization settings which will facilitate the cooler thermal fluid to optimize the LNG cryogenic energy for gas turbine inlet chilling, which can maintain the OEM recommended 59° F. temperature ISO efficiency standard for maximum rated MW output.

Additional cooling thermal fluid may be diverted to the condenser cooling for the WHRS process. After the cooler thermal fluid flows through the gas turbine air inlet chiller and/or the condenser, the thermal fluid will return via a closed-loop system to the floating thermal fluid source vessel(s) 18 and/or non-floating thermal fluid source 40, whereby trim heat may be applied as required to maintain the requisite (e.g., 108° F.) outflow thermal fluid temperature setting, which is transferred to the LNG vaporization system 14, whereby the cycle may be repeated.

Leveraging the REV Accelerated Gas Systems and REV Gas2Wire synergies by effectively optimizing thermal energy outputs will give aero derivative gas turbines a distinct advantage over reciprocating engines basis of significantly improved efficiency (e.g., from about 42% (simple cycle) to about 53% percent (combined cycle)) versus reciprocating engines at 47% (without co-gen) with significant reduction of closed-loop regasification fuel usage optimizing rejected heat as well as the value of the LNG cryogenic energy commodity on thermal reuse versus the typical closed-loop steam/glycol/water IFV system at 2.5% regasification fuel use, commonly used onboard FSRU(s).

A global glut of LNG, of which the supply and demand imbalance is steadily worsening, exists because of LNG liquefaction capacity (projects) currently in the pipeline. This creates an opportunity for a safe, reliable, lower capital and operating expense for flexible regasification system 5, employing the REV Accelerated Gas Systems platform, whereby natural gas can be competitively delivered to downstream end-users (e.g., boilers and power plant facilities) 85 consistent with the REV Gas2Wire platform on a fast track, turnkey basis similar to the FSRU model.

In addition to a number of mid and large scale LNG terminals coming online with significant LNG surplus volumes, a number of conventional LNG carriers are off charter and/or underemployed. Thus, the key elements are in place to serve constrained and/or stranded downstream markets as well as target the underserved regasification markets of less than 400 MMSCFD typically not able to commercially support a traditional FSRU generally sized for greater than 450 MMSCFD natural gas send out.

With the REV Accelerated Gas Systems platform, a conventional underemployed LNG carrier may participate in the FSRU niche market space with the opportunity to add value as a permanently (or semi-permanently) moored floating LNG storage vessel 16 associated with the regasification terminal 14, ideally on a long term charter.

Figure 11:
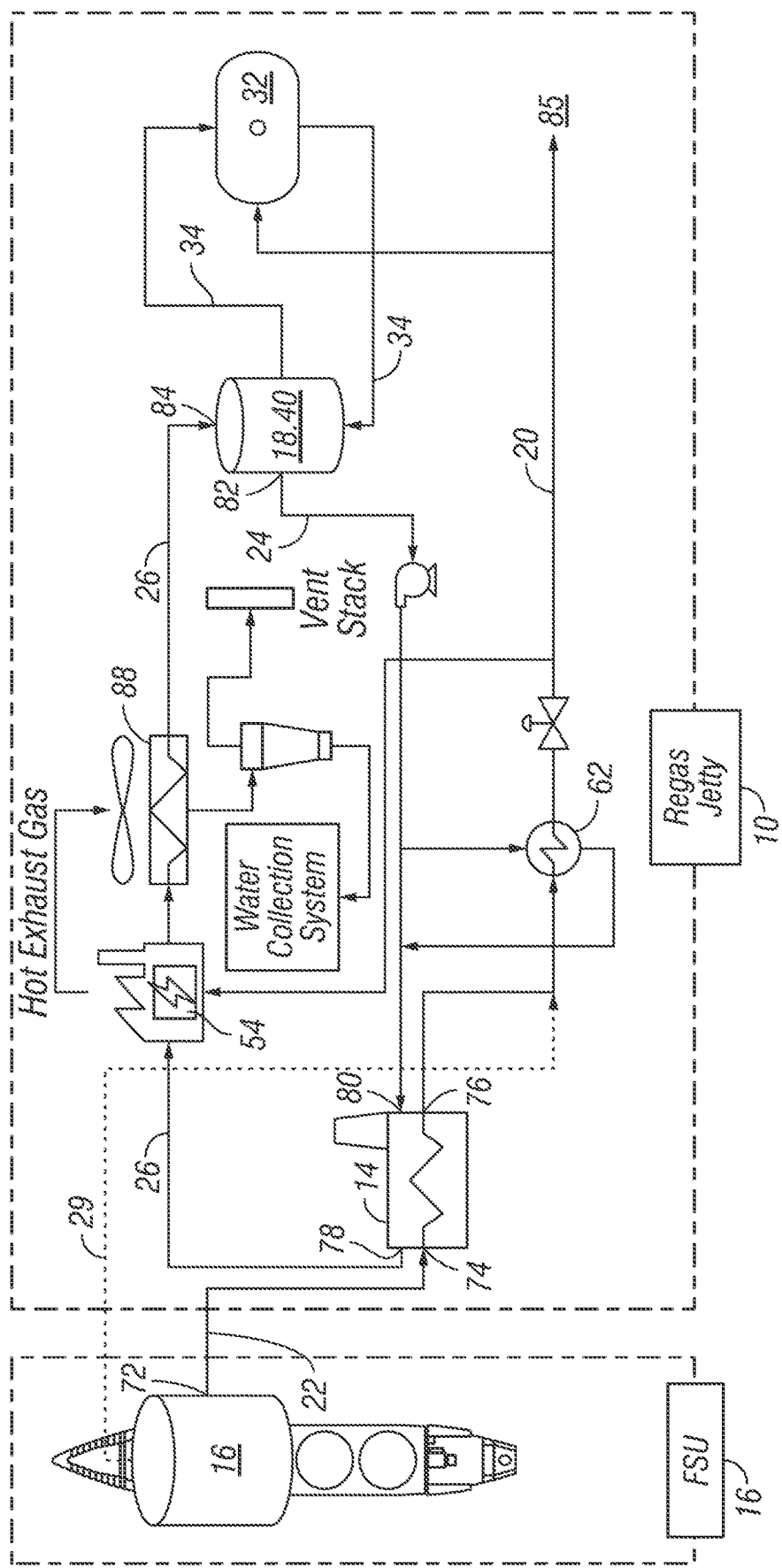
FIG. 11 is a block diagram illustrating an example flexible regasification system with a SCV unit integrating exhaust gas or hot air for additional heating of the thermal fluid for systems with power generation or waste heat gases, according to some embodiments.

FIG. 11 is a block diagram illustrating an example flexible regasification system 5 option with power generation exhaust or other waste heat gases, according to some embodiments. FIG. 11 is a particular example of the components illustrated in FIGS. 8-10. Flexible regasification system 5 includes vaporizers 14, such as a (SCV) (combustor off with the option to turn the combuster on), as the primary means of regasification (e.g., greater than 50 MMSCFD, less than 450 MMSCFD).

When coupled with power generation or other facilities with hot exhaust gases (e.g., cold thermal reuse facility 54), thermal fluid return line 26 can be further heated by incorporating heat exchanger 88 that transfers hot thermal energy from the exhaust gases into the thermal fluid return line 26. In effect, requirements for additional heating from heater(s) 32 and/or SCV 14 with combustor on may be completely eliminated, resulting in a more efficient and more eco-friendly solution with a lower carbon footprint. In some embodiments, heat exchanger 88 may comprise a fan condenser type with gas ductwork routed to the air inlet of heat exchanger 88, then continuing the ductwork from the air outlet of heat exchanger 88 to a safe location such as a vent stack for venting exhaust gases.

Finally, as the exhaust gas passes through heat exchanger 88, moisture in the gas may condense out because of the temperature drop of the gas. The water condensate may be collected and treated to provide fresh water to end-users.

While several embodiments have been provided in the present disclosure, it should be understood that the disclosed systems and methods might be embodied in many other specific forms without departing from the spirit or scope of the present disclosure. The present examples are to be considered as illustrative and not limited to the details given herein. For example, the various elements or components may be combined and/or integrated in another system and/or certain features may be omitted, or not implemented.

In addition, techniques, systems, subsystems, and methods described and illustrated in the various embodiments as discrete or separate may be combined and/or integrated with other systems, modules, techniques and/or methods without departing from the scope of the present disclosure. Other items shown or discussed as coupled and/or directly coupled or communicating with each other may be indirectly coupled or communicating through some interface, device, or intermediate component whether electrically, mechanically or otherwise. Other examples of changes, substitutions, and alterations are ascertainable by one skilled in the art and could be made without departing from scope disclosed herein.

The invention claimed is:

1. A flexible regasification system comprising:
   a floating liquefied natural gas (LNG) storage vessel comprising a LNG outlet operable to supply LNG from the LNG stored onboard the floating LNG storage vessel;
   a LNG vaporizer disposed on a jetty proximate the LNG storage vessel, the LNG vaporizer comprising;
   a LNG inlet coupled to the LNG outlet of the floating LNG storage vessel, the LNG inlet operable to receive LNG from the floating LNG storage vessel;
   a natural gas outlet operable to send natural gas downstream;
   a thermal fluid inlet operable to receive a heated thermal fluid;
   a thermal fluid outlet operable to discharge a cooled thermal fluid;
   wherein the LNG vaporizer is operable to use the heated thermal fluid to vaporize the LNG into natural gas, which converts the heated thermal fluid to a cooled thermal fluid; and a thermal fluid source comprising:
   a storage tank operable to store a thermal fluid;
   a heated thermal fluid outlet coupled to the thermal fluid inlet of the LNG vaporizer, the heated thermal fluid outlet operable to supply heated thermal fluid to the LNG vaporizer;
   a cooled thermal fluid inlet coupled to the thermal fluid outlet of the LNG vaporizer, the cooled thermal fluid inlet operable to receive cooled thermal fluid discharged from the LNG vaporizer;
   a gas heater, wherein:
   the as heater is coupled to the natural as outlet of the LNG vaporizer and operable to convert received natural gas to heat; and
   the gas heater is coupled to the thermal fluid source and operable to heat the thermal fluid in the storage tank of the thermal fluid source; and
   wherein the thermal fluid coupling between the thermal fluid source and the LNG vaporizer comprises a closed loop.

2. The flexible regasification system of claim 1, wherein the floating LNG storage vessel further comprises a boil-off gas outlet, and the boil off gas outlet is coupled to the gas heater.

3. The flexible regasification system of claim 1, further comprising a flare, the flare operable to dispose of natural gas not consumed by the gas heater.

4. The flexible regasification system of claim 1, wherein the thermal fluid source comprises a floating vessel.

5. The flexible regasification system of claim 4, wherein the gas heater is disposed on the floating vessel.

6. The flexible regasification system of claim 4, wherein the storage tank of the thermal fluid source comprises a storage tank integrated into a hull of the floating vessel.

7. The flexible regasification system of claim 6, wherein a space between the storage tank and the hull of the floating vessel comprises thermal insulation.

8. The flexible regasification system of claim 1, wherein the thermal fluid source comprises a storage tank disposed on the jetty.

9. The flexible regasification system of claim 1, further comprising a heat exchanger coupled to the natural gas outlet of the LNG vaporizer, the heat exchanger operable to heat the downstream natural gas to a predetermined temperature.

10. The flexible regasification system of claim 9, wherein the heat exchanger is coupled to the heated thermal fluid outlet of the thermal fluid source.

11. The flexible regasification system of claim 1, wherein the thermal fluid outlet of the LNG vaporizer is coupled to a cold thermal fluid reuse facility, and the cold thermal fluid reuse facility is coupled to the cooled thermal fluid inlet of the thermal fluid source.

12. The flexible regasification system of claim 11, further comprising a heat exchanger, the heat exchanger coupled to the cooled thermal fluid inlet of the thermal fluid source and an exhaust gas from the cold thermal reuse facility.

13. The flexible regasification system of claim 12, further comprising a condensate collection system operable to collect condensate moisture from the exhaust gas, the condensate collection system coupled to the heat exchanger.

14. The flexible regasification system of claim 11, wherein the cold thermal fluid reuse facility comprises at least one of a power plant, a data center, a refrigeration plant, and a district cooling source.

15. The flexible regasification system of claim 4, wherein the thermal fluid outlet of the LNG vaporizer is coupled to a cold thermal fluid reuse facility and the cold thermal fluid reuse facility is coupled to the cooled thermal fluid inlet of the thermal fluid source; and
wherein the cold thermal fluid reuse facility is disposed on the floating vessel.

16. The flexible regasification system of claim 1, wherein the heated thermal fluid outlet of the thermal fluid source is coupled to a hot thermal fluid reuse facility, and the hot thermal fluid reuse facility is coupled to the cooled thermal fluid inlet of the thermal fluid source.

17. The flexible regasification system of claim 16, wherein the hot thermal fluid reuse facility comprises at least one of a LNG vaporizer, a steam production plant, a hot water production plant, a desalination plant, and a district heating source.

18. The flexible regasification system of claim 4, wherein the heated thermal fluid outlet of the thermal fluid source is coupled to a hot thermal fluid reuse facility, and the hot thermal fluid reuse facility is coupled to the cooled thermal fluid inlet of the thermal fluid source; and
wherein the hot thermal fluid reuse facility is disposed on the floating vessel.

19. A floating thermal fluid source vessel comprising:
a thermal fluid storage tank operable to store a thermal fluid;
a thermal fluid outlet operable to supply heated thermal fluid; and
a thermal fluid inlet operable to receive cooled thermal fluid.

20. The floating thermal fluid source vessel of claim 19, wherein the thermal fluid storage tank is integrated into a hull of the floating thermal fluid storage vessel.

21. The floating thermal fluid source vessel of claim 20, wherein a space between the thermal fluid storage tank and the hull comprises thermal insulation.

22. The floating thermal fluid source vessel of claim 19, further comprising a heater, wherein:
the heater is operable to fire gas or fuel oil to generate heat; and
the heater is coupled to the thermal fluid storage tank and operable to heat a thermal fluid in the thermal fluid storage tank.

23. The floating thermal fluid source vessel of claim 19, wherein the thermal fluid outlet is coupled to a hot thermal fluid reuse facility, and the hot thermal fluid reuse facility is coupled to the cooled thermal fluid inlet.

24. The floating thermal fluid source vessel of claim 23, wherein the hot thermal fluid reuse facility comprises at least one of a LNG vaporizer, a steam production plant, a hot water production plant, a desalination plant, and a district heating source.

25. The floating thermal fluid source vessel of claim 24, wherein the hot thermal fluid reuse facility is disposed on the floating thermal fluid source vessel.

26. A method of regasifying liquefied natural gas (LNG), the method comprising:
positioning a floating LNG storage vessel proximate to a jetty;
positioning a LNG vaporizer on the jetty;
positioning a thermal fluid source proximate the LNG vaporizer;
coupling a gas heater to the thermal storage source;
transmitting LNG from the floating LNG storage vessel to the LNG vaporizer;
transmitting thermal fluid from the thermal fluid source to the LNG vaporizer; and
vaporizing the LNG using the thermal fluid.

27. The method of claim 26, wherein:
the floating LNG storage vessel comprises a LNG outlet;
the LNG vaporizer comprises:
a LNG inlet;
a natural gas outlet;
a thermal fluid inlet; and
a thermal fluid outlet;
the thermal fluid source comprises:
a heated thermal fluid outlet; and
a cooled thermal fluid inlet;
wherein the method further comprises:
coupling the LNG outlet of the floating LNG storage vessel to the LNG inlet of the LNG vaporizer;
coupling the heated thermal fluid outlet of the thermal fluid source to the thermal fluid inlet of the LNG vaporizer;
coupling the cooled thermal fluid inlet of the thermal fluid source to the thermal fluid outlet of the LNG vaporizer; and
wherein the coupling between the thermal fluid source and the LNG vaporizer comprises a closed loop.

28. The method of claim 26, further comprising coupling a boil-off gas outlet of the floating LNG storage vessel to the gas heater.

29. The method of claim 26, wherein the thermal fluid source comprises a floating vessel.

30. The method of claim 26, further comprising positioning the gas heater on the floating vessel.

31. The method of claim 26, wherein the floating vessel comprises a storage tank integrated into a hull of the floating vessel.

32. The method of claim 31, wherein a space between the storage tank and the hull of the floating vessel comprises thermal insulation.

33. The method of claim 26, wherein the thermal fluid source comprises a storage tank disposed on the jetty.

34. The method of claim 26, further comprising coupling a heat exchanger to the natural gas outlet of the LNG vaporizer, the heat exchanger operable to heat the downstream natural gas to a predetermined temperature.

35. The method of claim 34, further comprising coupling the heat exchanger to the heated thermal fluid outlet of the thermal fluid source.

36. The method of claim 26, further comprising:
coupling the thermal fluid outlet of the LNG vaporizer to a cold thermal fluid reuse facility; and
coupling the cold thermal fluid reuse facility to the cooled thermal fluid inlet of the thermal fluid source.

37. The method of claim 36, further comprising coupling a heat exchanger to the cooled thermal fluid inlet of the thermal fluid source and to an exhaust gas from the cold thermal reuse facility.

38. The method of claim 37, further comprising coupling a condensate collection system to the heat exchanger, the condensate collection system operable to collect condensate moisture from the exhaust gas.

39. The method of claim 36, wherein the cold thermal fluid reuse facility comprises at least one of a power plant, a data center, a refrigeration plant, and a district cooling source.

40. The method of claim 36, wherein the cold thermal fluid reuse facility is disposed on the floating thermal source vessel.

41. The method of claim 26, further comprising:
coupling the thermal fluid outlet of the thermal fluid source to a hot thermal fluid reuse facility; and
coupling the hot thermal fluid reuse facility to the cooled thermal fluid inlet of the thermal fluid source.

42. The method of claim 41, wherein the hot thermal fluid reuse facility comprises at least one of a LNG vaporizer, a steam production plant, a hot water production plant, a desalination plant, and a district heating source.

43. The method of claim 42, wherein the hot thermal fluid reuse facility is disposed on the floating thermal source vessel.

* * * * *